US012786995B2

(12) United States Patent
Maamari et al.

(10) Patent No.: US 12,786,995 B2
(45) Date of Patent: Nov. 3, 2026

(54) UNUSED TRANSMISSION OCCASION INDICATION IN UPLINK CONTROL INFORMATION

(71) Applicant: QUALCOMM Incorporated, San Diego, CA (US)

(72) Inventors: Diana Maamari, San Diego, CA (US); Abdelrahman Mohamed Ahmed Mohamed Ibrahim, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 18/541,222

(22) Filed: Dec. 15, 2023

(65) Prior Publication Data

US 2025/0203606 A1 Jun. 19, 2025

(51) Int. Cl.
*H04W 72/1268* (2023.01)
*H04L 1/1607* (2023.01)
*H04W 72/21* (2023.01)
*H04W 72/512* (2023.01)

(52) U.S. Cl.
CPC ....... *H04W 72/1268* (2013.01); *H04L 1/1614* (2013.01); *H04W 72/21* (2023.01); *H04W 72/512* (2023.01)

(58) Field of Classification Search
CPC ............. H04W 72/1268; H04W 72/21; H04W 72/512; H04W 72/115; H04L 1/1614; H04L 5/0053
See application file for complete search history.

(56) References Cited

U.S. PATENT DOCUMENTS

| | | | | |
|---|---|---|---|---|
| 2024/0357599 | A1* | 10/2024 | Park | H04W 72/0446 |
| 2024/0381358 | A1* | 11/2024 | Yin | H04L 5/0078 |
| 2025/0030512 | A1* | 1/2025 | Muruganathan | H04W 72/1268 |
| 2025/0055642 | A1* | 2/2025 | Yang | H04L 5/0053 |
| 2025/0113363 | A1* | 4/2025 | Saeed | H04W 72/1268 |
| 2025/0142575 | A1* | 5/2025 | Kuo | H04W 72/569 |
| 2025/0159679 | A1* | 5/2025 | Babaei | H04W 72/21 |
| 2025/0358814 | A1* | 11/2025 | Nagano | H04W 72/0446 |
| 2025/0374263 | A1* | 12/2025 | Xu | H04L 1/1614 |

* cited by examiner

*Primary Examiner* — Yu-Wen Chang
(74) *Attorney, Agent, or Firm* — Holland & Hart LLP

(57) ABSTRACT

Methods, systems, and devices for wireless communications are described. A user equipment (UE) may transmit signaling indicating whether the UE expects to use each of multiple transport blocks (TBs) in one or more configured grant (CG) physical uplink shared channel (PUSCH) occasions. The network may schedule CG PUSCH occasions for transmission of low latency communications to avoid the latency involved with scheduling requests from a UE. Some UEs may be capable of transmitting multiple (e.g., two) TBs within a same CG PUSCH. A UE may indicate in a UCI whether the UE expects to use each of the multiple TBs in one or more CG PUSCH occasions. For example, if a UE indicates that the UE expects to use less than all of the TBs for a CG PUSCH occasion, the network may assign the unused resources (e.g., spatial resources) to another UE.

30 Claims, 18 Drawing Sheets

UNUSED TRANSMISSION OCCASION INDICATION IN UPLINK CONTROL INFORMATION

TECHNICAL FIELD

The following relates to wireless communications, including unused transmission occasion indication in uplink control information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Components within a wireless communication system may be coupled (for example, operatively, communicatively, functionally, electronically, and/or electrically) to each other.

SUMMARY

The described techniques relate to improved methods, systems, devices, and apparatuses that support unused transmission occasion indication in uplink control information (UCI). For example, the described techniques provide for signaling indicating whether a user equipment (UE) expects to use each of multiple transport blocks (TBs) in one or more configured grant (CG) physical uplink shared channel (PUSCH) occasions. The network may schedule CG PUSCH occasions for transmission of low latency communications to avoid the latency involved with scheduling requests from a UE. Some UEs may be capable of transmitting multiple (e.g., two) TBs within a same CG PUSCH. A UE may indicate in a UCI whether the UE expects to use each of the multiple TBs in one or more CG PUSCH occasions. For example, if a UE indicates that the UE expects to use less than all of the TBs for a CG PUSCH occasion, the network may assign the unused resources to another UE. In some examples, the UE may use a two stage indication in the UCI to indicate whether the UE expects to use each TB in one or more CG PUSCH occasions. For example, in a first stage, the UE may include a bit for each CG PUSCH (e.g., for a configured quantity of CG PUSCH occasions) indicating whether at least one TB in each CG PUSCH occasion is skipped, and a second set of bits for each CG PUSCH occasion in which at least one TB is skipped indicating which TB(s) are skipped. As another example, the UE may use a bitmap in the UCI that includes a single bit for each TB for each of the one or more CG PUSCH occasions. As another example, the UE may include multiple bitmaps in the UCI that correspond to the multiple TBs for the one or more CG PUSCH occasions.

A method for wireless communications by a user equipment (UE) is described. The method may include receiving control signaling scheduling a set of CG uplink shared channel occasions, where each CG uplink shared occasion of the set of CG uplink shared channel occasions is configured for transmission of at least two TBs and transmitting UCI including an indication of use for each of the at least two TBs relating to a subset of the set of CG uplink shared channel occasions.

A UE for wireless communications is described. The UE may include one or more memories storing processor-executable code, and one or more processors coupled with (e.g., operatively, communicatively, functionally, electronically, or electrically) the one or more memories. The one or more processors may be individually or collectively operable to execute the code (e.g., directly, indirectly, after pre-processing, without pre-processing) to cause the UE to receive control signaling scheduling a set of CG uplink shared channel occasions, where each CG uplink shared occasion of the set of CG uplink shared channel occasions is configured for transmission of at least two TBs and transmit UCI including an indication of use for each of the at least two TBs relating to a subset of the set of CG uplink shared channel occasions.

Another UE for wireless communications is described. The UE may include means for receiving control signaling scheduling a set of CG uplink shared channel occasions, where each CG uplink shared occasion of the set of CG uplink shared channel occasions is configured for transmission of at least two TBs and means for transmitting UCI including an indication of use for each of the at least two TBs relating to a subset of the set of CG uplink shared channel occasions.

A non-transitory computer-readable medium storing code for wireless communications is described. The code may include instructions executable by at least one processor (e.g., directly, indirectly, after pre-processing, without pre-processing) to receive control signaling scheduling a set of CG uplink shared channel occasions, where each CG uplink shared occasion of the set of CG uplink shared channel occasions is configured for transmission of at least two TBs and transmit UCI including an indication of use for each of the at least two TBs relating to a subset of the set of CG uplink shared channel occasions.

In some examples of the method, UEs, and non-transitory computer-readable medium described herein, the indication of use includes a first set of bits identifying one or more CG uplink shared channel occasions of the subset for which the UE expects to transmit fewer than all of the at least two TBs, and the indication of use further includes a second set of bits indicating, for each of the one or more CG uplink shared channel occasions of the subset, one or more TBs that the UE expects to skip of the at least two TBs.

In some examples of the method, UEs, and non-transitory computer-readable medium described herein, the indication of use includes a first set of bits identifying one or more CG uplink shared channel occasions of the subset for which the UE expects to transmit at least one of the at least two TBs, and the indication of use further includes a second set of bits indicating, for each of the one or more CG uplink shared channel occasions of the subset, one or more TBs that the UE expects to transmit of the at least two TBs.

In some examples of the method, UEs, and non-transitory computer-readable medium described herein, the indication of use includes a bitmap including a respective bit indicating whether the UE expects to transmit each of the at least two TBs for each CG uplink shared channel occasion of the subset.

In some examples of the method, UEs, and non-transitory computer-readable medium described herein, the indication of use includes a respective bitmap for each of the at least two TBs and each respective bitmap indicates whether the UE expects to transmit the respective TB for each CG uplink shared channel occasion of the subset.

In some examples of the method, UEs, and non-transitory computer-readable medium described herein, transmitting the UCI may include operations, features, means, or instructions for transmitting the UCI via a first CG uplink shared channel occasion of the set of CG uplink shared channel occasions.

Some examples of the method, UEs, and non-transitory computer-readable medium described herein may further include operations, features, means, or instructions for transmitting, via a second CG uplink shared channel occasion of the set of CG uplink shared channel occasions subsequent to the first CG uplink shared channel occasion, second UCI including a second indication of use for each of the at least two TBs with respect to a second subset of the set of CG uplink shared channel occasions, where at least one CG uplink shared channel occasion may be included in the subset and the second subset.

In some examples of the method, UEs, and non-transitory computer-readable medium described herein, the indication of use indicates that the UE expects to transmit a first TB of the at least one CG uplink shared channel occasion and the second indication of use indicates that the UE does not expect to transmit the first TB of the at least one CG uplink shared channel occasion.

In some examples of the method, UEs, and non-transitory computer-readable medium described herein, the second indication of use indicates that the UE does not expect to transmit each TB of each of the at least one CG uplink shared channel occasion that the indication of use indicates that the UE does not expect to transmit.

Some examples of the method, UEs, and non-transitory computer-readable medium described herein may further include operations, features, means, or instructions for receiving, via the control signaling or via second control signaling, an indication of a quantity of uplink shared channel occasions to include in the subset.

Some examples of the method, UEs, and non-transitory computer-readable medium described herein may further include operations, features, means, or instructions for transmitting at least one TB in a CG uplink shared channel occasion of the subset, where the indication of use indicates that the UE expects to transmit the at least one TB.

In some examples of the method, UEs, and non-transitory computer-readable medium described herein, the UE does not transmit in any TB that the indication of use indicates the UE does not expect to transmit.

In some examples of the method, UEs, and non-transitory computer-readable medium described herein, the at least two TBs for each of the set of CG uplink shared channel occasions may be spatially division multiplexed.

A method for wireless communications by a network entity is described. The method may include outputting, to a UE, control signaling scheduling a set of CG uplink shared channel occasions, where each CG uplink shared occasion of the set of CG uplink shared channel occasions is configured for transmission of at least two TBs and obtaining, from the UE, UCI including an indication of use for each of the at least two TBs relating to a subset of the set of CG uplink shared channel occasions.

A network entity for wireless communications is described. The network entity may include one or more memories storing processor-executable code, and one or more processors coupled with (e.g., operatively, communicatively, functionally, electronically, or electrically) the one or more memories. The one or more processors may be individually or collectively operable to execute the code (e.g., directly, indirectly, after pre-processing, without pre-processing) to cause the network entity to output, to a UE, control signaling scheduling a set of CG uplink shared channel occasions, where each CG uplink shared occasion of the set of CG uplink shared channel occasions is configured for transmission of at least two TBs and obtain, from the UE, UCI including an indication of use for each of the at least two TBs relating to a subset of the set of CG uplink shared channel occasions.

Another network entity for wireless communications is described. The network entity may include means for outputting, to a UE, control signaling scheduling a set of CG uplink shared channel occasions, where each CG uplink shared occasion of the set of CG uplink shared channel occasions is configured for transmission of at least two TBs and means for obtaining, from the UE, UCI including an indication of use for each of the at least two TBs relating to a subset of the set of CG uplink shared channel occasions.

A non-transitory computer-readable medium storing code for wireless communications is described. The code may include instructions executable by at least one processor (e.g., directly, indirectly, after pre-processing, without pre-processing) to output, to a UE, control signaling scheduling a set of CG uplink shared channel occasions, where each CG uplink shared occasion of the set of CG uplink shared channel occasions is configured for transmission of at least two TBs and obtain, from the UE, UCI including an indication of use for each of the at least two TBs relating to a subset of the set of CG uplink shared channel occasions.

In some examples of the method, network entities, and non-transitory computer-readable medium described herein, the indication of use includes a first set of bits identifying one or more CG uplink shared channel occasions of the subset for which the UE expects to transmit fewer than all of the at least two TBs, and the indication of use further includes a second set of bits indicating, for each of the one or more CG uplink shared channel occasions of the subset, one or more TBs that the UE expects to skip of the at least two TBs.

In some examples of the method, network entities, and non-transitory computer-readable medium described herein, the indication of use includes a first set of bits identifying one or more CG uplink shared channel occasions of the subset for which the UE expects to transmit at least one of the at least two TBs, and the indication of use further includes a second set of bits indicating, for each of the one or more CG uplink shared channel occasions of the subset, one or more TBs that the UE expects to transmit of the at least two TBs.

In some examples of the method, network entities, and non-transitory computer-readable medium described herein, the indication of use includes a bitmap including a respective bit indicating whether the UE expects to transmit each of the at least two TBs for each CG uplink shared channel occasion of the subset.

In some examples of the method, network entities, and non-transitory computer-readable medium described herein, the indication of use includes a respective bitmap for each of the at least two TBs and each respective bitmap indicates whether the UE expects to transmit the respective TB for each CG uplink shared channel occasion of the subset.

In some examples of the method, network entities, and non-transitory computer-readable medium described herein, obtaining the UCI may include operations, features, means, or instructions for obtaining the UCI via a first CG uplink shared channel occasion of the set of CG uplink shared channel occasions.

Some examples of the method, network entities, and non-transitory computer-readable medium described herein may further include operations, features, means, or instructions for obtaining, via a second CG uplink shared channel occasion of the set of CG uplink shared channel occasions subsequent to the first CG uplink shared channel occasion, second UCI including a second indication of use for each of the at least two TBs with respect to a second subset of the set of CG uplink shared channel occasions, where at least one CG uplink shared channel occasion may be included in the subset and the second subset.

In some examples of the method, network entities, and non-transitory computer-readable medium described herein, the indication of use indicates that the UE expects to transmit a first TB of the at least one CG uplink shared channel occasion and the second indication of use indicates that the UE does not expect to transmit the first TB of the at least one CG uplink shared channel occasion.

In some examples of the method, network entities, and non-transitory computer-readable medium described herein, the second indication of use indicates that the UE does not expect to transmit each TB of each of the at least one CG uplink shared channel occasion that the indication of use indicates that the UE does not expect to transmit.

Some examples of the method, network entities, and non-transitory computer-readable medium described herein may further include operations, features, means, or instructions for outputting, via the control signaling or via second control signaling, an indication of a quantity of uplink shared channel occasions to include in the subset.

Some examples of the method, network entities, and non-transitory computer-readable medium described herein may further include operations, features, means, or instructions for obtaining, from the UE, at least one TB in a CG uplink shared channel occasion of the subset, where the indication of use indicates that the UE expects to transmit the at least one TB.

In some examples of the method, network entities, and non-transitory computer-readable medium described herein, the at least two TBs for each of the set of CG uplink shared channel occasions may be spatially division multiplexed.

DETAILED DESCRIPTION

Figure 1:
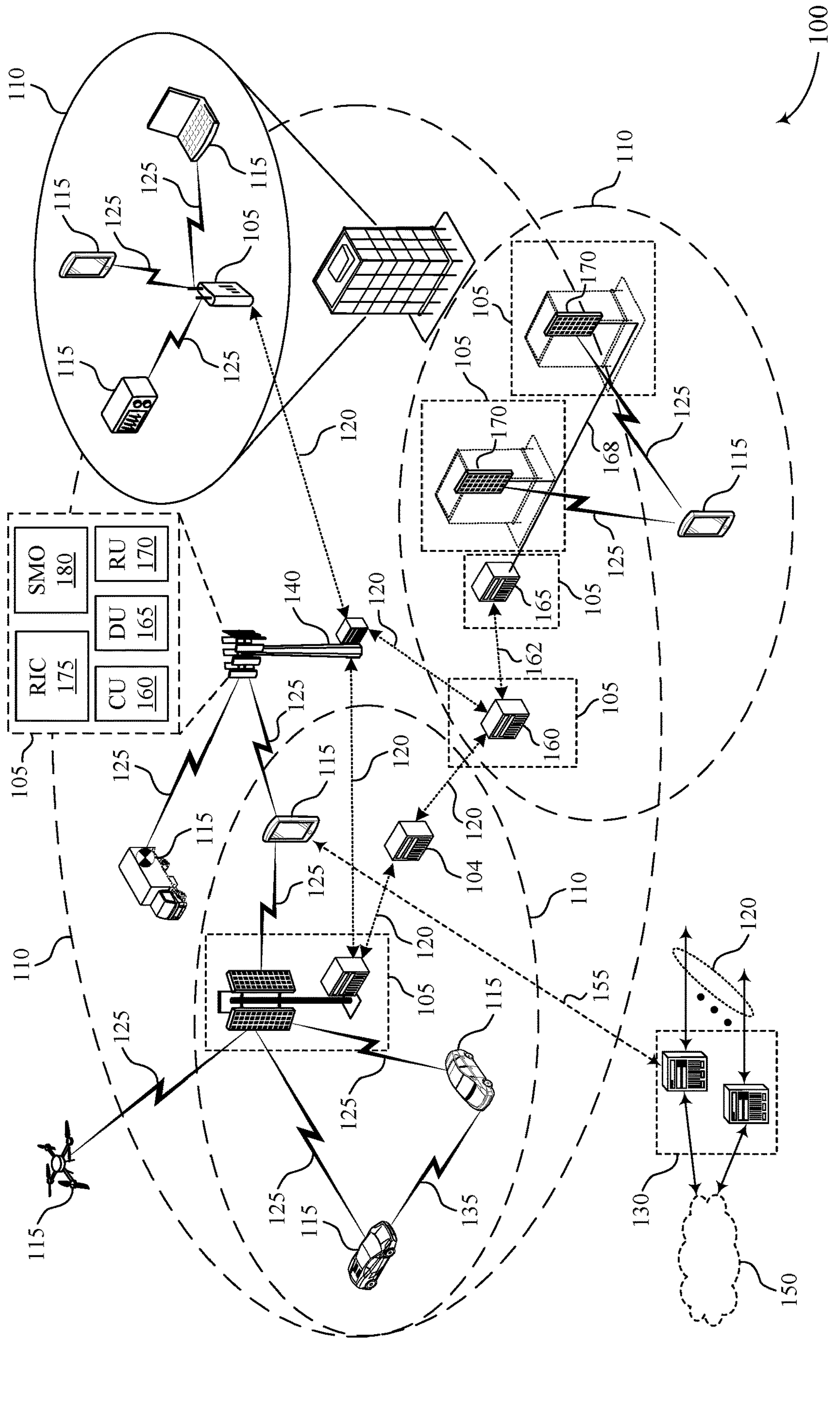
FIG. 1 shows an example of a wireless communications system that supports unused transmission occasion indication in uplink control information (UCI) in accordance with one or more aspects of the present disclosure.

Extended reality (XR) traffic in a wireless communications system may include virtual reality traffic or augmented reality traffic. XR traffic may demand high reliability and low latency transmissions. For some low latency communications, such as for XR, the network may provide preconfigured uplink resources to a user equipment (UE). For example, the network may schedule configured grant (CG) physical uplink shared channel (PUSCH) occasions for transmission of low latency communications to avoid the latency involved with scheduling requests from a UE. In some low latency communications, such as XR, packet size may be variable and random, and accordingly the sizes of the CG PUSCH resources may be based on the largest possible packet size. To avoid the waste of uplink resources, a UE may transmit an uplink control information (UCI) indicating if the UE expects to use each of the CG PUSCH occasions, for example, via a bitmap in the UCI. Each bit in the bitmap may correspond to one CG PUSCH occasion. If a UE indicates that the UE does not expect to use a CG PUSCH occasion, the network may reassign the resources of the indicated CG PUSCH occasion to another UE. Some UEs may be capable of transmitting multiple (e.g., two) transport blocks (TBs) within a same CG PUSCH. For example, the UE may transmit one TB via a first set of spatial layers and a second TB via a second set of layers (e.g., the TBs may be spatially multiplexed). Signaling whether a CG PUSCH will be used or not, however, does not account for a scenario where a UE may use less than all of the multiple TBs in a CG PUSCH.

A UE may indicate in a UCI whether the UE expects to use each of the multiple TBs in one or more CG PUSCH occasions. For example, if a UE indicates that the UE expects to use less than all of the TBs for a CG PUSCH occasion, the network may assign the unused resources (e.g., spatial resources) to another UE. In some examples, the UE may use a two stage indication in the UCI to indicate whether the UE expects to use each TB in one or more CG PUSCH occasions. For example, in a first stage, the UE may include a bit for each CG PUSCH (e.g., for a configured quantity of CG PUSCH occasions) indicating whether at least one TB in each CG PUSCH occasion is skipped, and a second set of bits for each CG PUSCH occasion in which at least one TB is skipped indicating which TB(s) are skipped. As another example, the UE may use a bitmap in the UCI that includes a single bit for each TB for each of the one or more CG PUSCH occasions. As another example, the UE may include multiple bitmaps in the UCI that correspond to the multiple TBs for the one or more CG PUSCH occasions.

Aspects of the disclosure are initially described in the context of wireless communications systems. Aspects of the disclosure are further illustrated by and described with reference to diagrams of sets of uplink transmission occasions, process flows, apparatus diagrams, system diagrams, and flowcharts that relate to unused transmission occasion indication in UCI.

FIG. 1 shows an example of a wireless communications system 100 that supports unused transmission occasion indication in UCI in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support unused transmission occasion indication in UCI as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may support XR traffic. XR traffic may demand high reliability and low latency transmissions. For some low latency communications, such as for XR, a network entity 105 may provide pre-configured uplink resources to a UE 115. For example, the network entity 105 may schedule CG PUSCH occasions for transmission of low latency communications to avoid the latency involved with scheduling requests from a UE 115. In some low latency communications, such as XR, packet size may be variable and random, and accordingly the sizes of the CG PUSCH resources may be based on the largest possible packet size. To avoid the waste of uplink resources, a UE 115 may transmit a UCI indicating if the UE 115 expects to use each of the CG PUSCH occasions, for example, via a bitmap in the UCI. Each bit in the bitmap may correspond to one CG PUSCH occasion. If a UE 115 indicates that the UE 115 does not expect to use a CG PUSCH occasion, the network may reassign the resources of the indicated CG PUSCH occasion to another UE 115.

Some UEs 115 may be capable of transmitting multiple (e.g., two) TBs within a same CG PUSCH. For example, a UE 115 may support 4 or more transmission layers, and use of 4 or more transmission layers may support simultaneous transmission of two or more codewords or TBs. For example, the UE 115 may transmit one TB via a first set of spatial layers and a second TB via a second set of layers (e.g., the TBs may be spatially multiplexed). Signaling whether a CG PUSCH will be used or not, however, does not account for a scenario where a UE 115 may use less than all of the multiple TBs in a CG PUSCH.

A UE 115 may indicate in a UCI whether the UE 115 expects to use each of the multiple TBs in one or more CG PUSCH occasions. For example, for spatially division multiplexed (SDM) TBs, if a UE 115 indicates that the UE 115 expects to use less than all of the TBs for a CG PUSCH occasion, the network entity 105 may assign the unused spatial resources to another UE 115. In some examples, the UE 115 may use a two stage indication in the UCI to indicate whether the UE 115 expects to use each TB in one or more CG PUSCH occasions. For example, in a first stage, the UE 115 may include a bit for each CG PUSCH (e.g., for a configured quantity of CG PUSCH occasions) indicating whether at least one TB in each CG PUSCH occasion is skipped, and a second set of bits for each CG PUSCH occasion in which at least one TB is skipped indicating which TB(s) are skipped. As another example, the UE 115 may use a bitmap in the UCI that includes a single bit for each TB for each of the one or more CG PUSCH occasions. As another example, the UE 115 may include multiple bitmaps in the UCI that correspond to the multiple TBs for the one or more CG PUSCH occasions.

Figure 2:
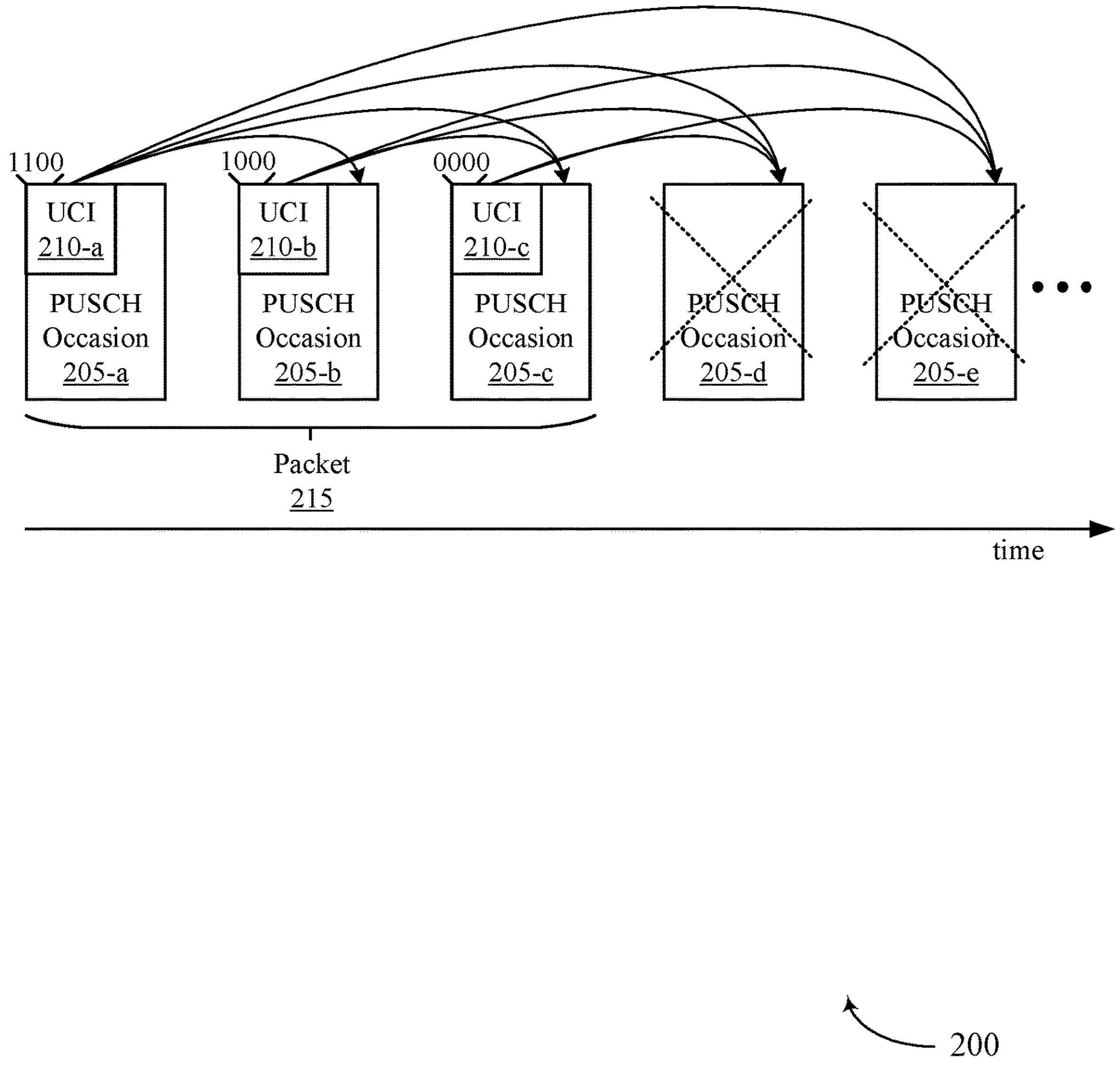
FIG. 2 shows an example of a diagram of a set of uplink transmission occasions that supports unused transmission occasion indication in UCI in accordance with one or more aspects of the present disclosure.

FIG. 2 shows an example of a diagram 200 of a set of uplink transmission occasions that supports unused transmission occasion indication in UCI in accordance with one or more aspects of the present disclosure. The diagram 200 of the set of uplink transmission occasions may implement or may be implemented by the wireless communications system 100.

As described herein, a network entity 105 may schedule pre-configured uplink resources for a UE 115 for low latency communications, such as for XR, to avoid latency associated with scheduling requests and buffer status reports based on dynamic scheduling and assignment of resources. For example, the network entity 105 may schedule a set of CG PUSCH occasions (e.g., a CG PUSCH occasion 205-*a*, a CG PUSCH occasion 205-*b*, a CG PUSCH occasion 205-*c*, a CG PUSCH occasion 205-*d* and a CG PUSCH occasion 205-*e*) for a UE 115. Video traffic (such as XR traffic) may have large and random packet size as compared to voice traffic or uplink control traffic. In some cases, the network entity 105 may accordingly schedule the set of CG PUSCH occasions 205 based on the largest possible packet size to minimize delay in video transfer. In some examples, the multiple CG PUSCH occasions 205 may be included (e.g., scheduled) in a single CG PUSCH configuration.

The pre-configured uplink resources for XR video generation cycle may be larger than the average video packet size. To avoid the waste of uplink resources, the UE 115 may include an unused transmission occasion (UTO) indication in UCI 210 (e.g., UCI 210 in a CG PUSCH occasion 205 that is used by the UE 115) which may indicate whether the UE 115 intends to use future CG PUSCH occasions. The UTO in a UCI may be referred to as a UTO-UCI. In some examples, the UTO-UCI may be a bitmap with each bit indicating whether the UE 115 expects to use a corresponding pre-configured CG PUSCH occasion. A UTO-UCI may be included within a CG PUSCH and may indicate whether the UE 115 expects to use future pre-configured CG PUSCH occasions.

For example, a UE 115 may determine that a video packet 215 will use three CG PUSCH occasions. Accordingly, a UTO-UCI in the UCI 210-*a* transmitted in the CG PUSCH occasion 205-*a* may have a value of "1100" to indicate that the UE 115 expects to use the next two CG PUSCH occasions (CG PUSCH occasion 205-*b* and CG PUSCH occasion 205-*c*) and the UE 115 does not expect to use the following two CG PUSCH occasions (CG PUSCH occasion 205-*d* and CG PUSCH occasion 205-*e*). For example, a value "1" may indicate the UE 115 expects to use the corresponding CG PUSCH occasion 205 and the value "0" may indicate the UE 115 does not expect to use the corresponding CG PUSCH occasion 205. Similarly, a UTO-UCI in the UCI 210-*b* transmitted in the CG PUSCH occasion 205-*b* may have a value of "1000" to indicate that the UE 115 expects to use the next CG PUSCH occasions (CG PUSCH occasion 205-*c*) and the UE 115 does not expect to use the following three CG PUSCH occasions (CG PUSCH occasion 205-*d*, CG PUSCH occasion 205-*e*, and a subsequent CG PUSCH occasion). Similarly, a UTO-UCI in the UCI 210-*c* transmitted in the CG PUSCH occasion 205-*c* may have a value of "0000" to indicate that the UE 115 does not expect to use the next four CG PUSCH occasions (CG PUSCH occasion 205-*d*, CG PUSCH occasion 205-*e*, and two subsequent CG PUSCH occasions).

The size of the bitmap (e.g., how many future CG PUSCH occasions for which to indicate an intention of use) may be configured by the network, for example, in RRC signaling. In some examples, the bitmap may be up to 8 bits. In some examples, the size of the bitmap may be sliding (e.g., may adjust based on a remaining amount of CG PUSCH occasions in a CG PUSCH configuration/window). In some examples, the offset in CG PUSCH occasions 205 between the indicating UCI 210 and the first CG PUSCH occasion 205 for which the UTO-UCI is applicable (e.g., how many CG PUSCH occasions are between the CG PUSCH occasion 205-*a* that includes the UCI 210-*a* and the CG PUSCH occasion 205-*b*) may be configured via RRC signaling.

The dynamic indication of whether a UE 115 expects to use a CG PUSCH occasion allows the network to reassign the resources of the indicated CG PUSCH occasion to another UE 115. For example, the network entity 105 may reassign the resources of the CG PUSCH occasion 205-*d* and the CG PUSCH occasion 205-*e* to another UE 115 based on the indication in the UCI 210-*a* that the UE 115 does not expect to use the CG PUSCH occasion 205-*d* and the CG PUSCH occasion 205-*e*.

As described herein, however, some UEs 115 may be capable of transmitting multiple (e.g., two) TBs within a same CG PUSCH occasion 205. Use of a single bit to indicate whether a CG PUSCH occasion 205 will be used or not, however, does not account for a scenario where a UE 115 may use less than all of the multiple TBs in a CG PUSCH occasion. For example, where there are two TBs per CG PUSCH occasion, there are four possible states per CG PUSCH occasion: (1) the UE 115 expects to transmit the first TB and the UE 115 does not expect to transmit the second TB; (2) the UE 115 does not expect to transmit the first TB the and UE 115 expects to transmit the second TB; (3) the UE 115 does not expect to transmit either TB; or (4) the UE 115 expects to transmit both TBs.

Accordingly, as described herein, a UE 115 may indicate in a UCI whether the UE 115 expects to use each of the multiple TBs in one or more CG PUSCH occasions 205. For example, for SDM TBs, if a UE 115 indicates the UE 115 expects to use less than all of the TBs for a CG PUSCH occasion, the network entity 105 may assign the unused spatial resources to another UE 115. As another example, an indication that one of the TBs will not be used may mean that the UE 115 will not use the associated higher layer, which may help the network entity 105 determine whether uplink SDM is feasible or not with manageable interference. For example, if the UE 115 indicates that both TBs are transmitted over 8 layers, the network entity 105 may determine not to schedule uplink SDM for a given CG PUSCH occasion and may schedule uplink communications for other UEs on different resources.

Figure 3:
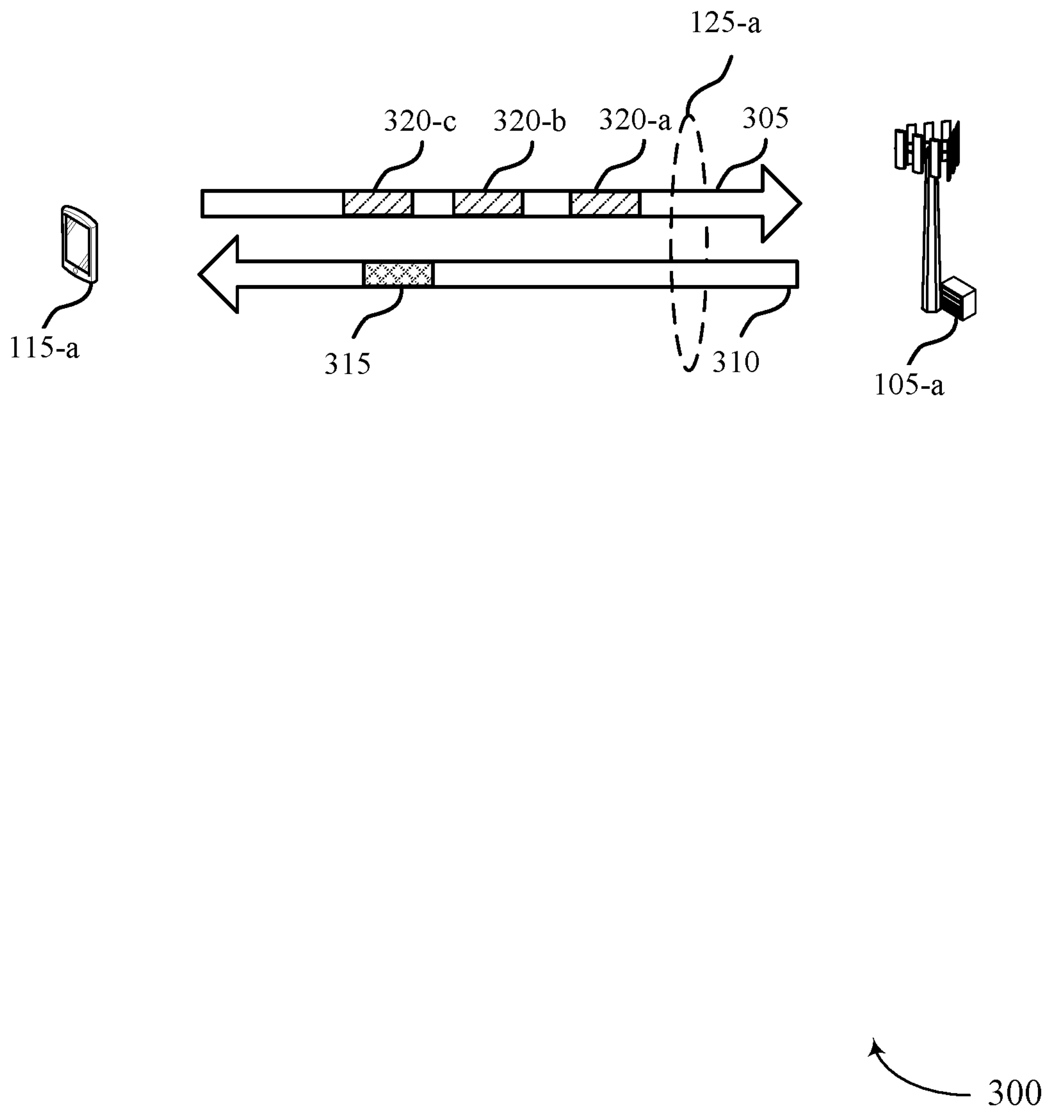
FIG. 3 shows an example of a wireless communication system that supports unused transmission occasion indication in UCI in accordance with one or more aspects of the present disclosure.

FIG. 3 shows an example of a wireless communications system 300 that supports unused transmission occasion indication in UCI in accordance with one or more aspects of the present disclosure. The wireless communications system 300 may implement or may be implemented by aspects of the wireless communications system 100. For example, the wireless communications system 300 may include a UE 115-*a*, which may be an example of a UE 115 as described herein. The wireless communications system 300 may include a network entity 105-*a*, which may be an example of a network entity 105 as described herein.

The UE 115-*a* may communicate with the network entity 105-*a* using a communication link 125-*a*. The communication link 125-*a* may be an example of an NR or LTE link between the UE 115-*a* and the network entity 105-*a*. The communication link 125-*a* may include a bi-directional link that enables both uplink and downlink communications. For example, the UE 115-*a* may transmit uplink signals 305 (e.g., uplink transmissions), such as uplink control signals or uplink data signals, to the network entity 105-*a* using the communication link 125-*a* and the network entity 105-*a* may transmit downlink signals 310 (e.g., downlink transmissions), such as downlink control signals or downlink data signals, to the UE 115-*a* using the communication link 125-*a*.

The network entity 105-*a* may transmit control signaling 315 scheduling a set of CG PUSCH occasions, where each CG PUSCH occasion of the set of CG PUSCH occasions is configured for transmission of at least two TBs.

The UE 115-*a* may transmit a UCI in a first CG PUSCH 320-*a* of the set of CG PUSCH occasions, where the UCI includes an indication of use for each of the at least two TBs for a subset of the set of CG PUSCH occasions. For example, the UCI may indicate that the UE 115-*a* may expect to transmit at least one TB in a second CG PUSCH occasion, that the UE 115-*a* may expect to transmit at least one TB in a third CG PUSCH occasion, and that the UE 115-*a* may not expect to transmit at least one TB in a fourth CG PUSCH occasion. Accordingly, the UE 115-*a* may transmit the second CG PUSCH 320-*b* including the indicated at least one TB in the second CG PUSCH occasion, the UE 115-*a* may transmit the third CG PUSCH 320-*c* including the indicated at least one TB in the third CG PUSCH occasion, and the UE 115-*a* may not transmit in the fourth CG PUSCH occasion.

In some examples, for example, as described with reference to FIGS. 4 and 5, the UE 115 may use a two stage indication in the UCI to indicate whether the UE 115 expects to transmit each TB in one or more CG PUSCH occasions. In some examples, for example, as described with reference to FIGS. 6 and 7, the UE 115 may use a bitmap in the UCI that includes a single bit for each TB for each of the one or more CG PUSCH occasions. In some examples, the UE 115 may include multiple bitmaps in the UCI that correspond to the multiple TBs for the one or more CG PUSCH occasions.

Figure 4:
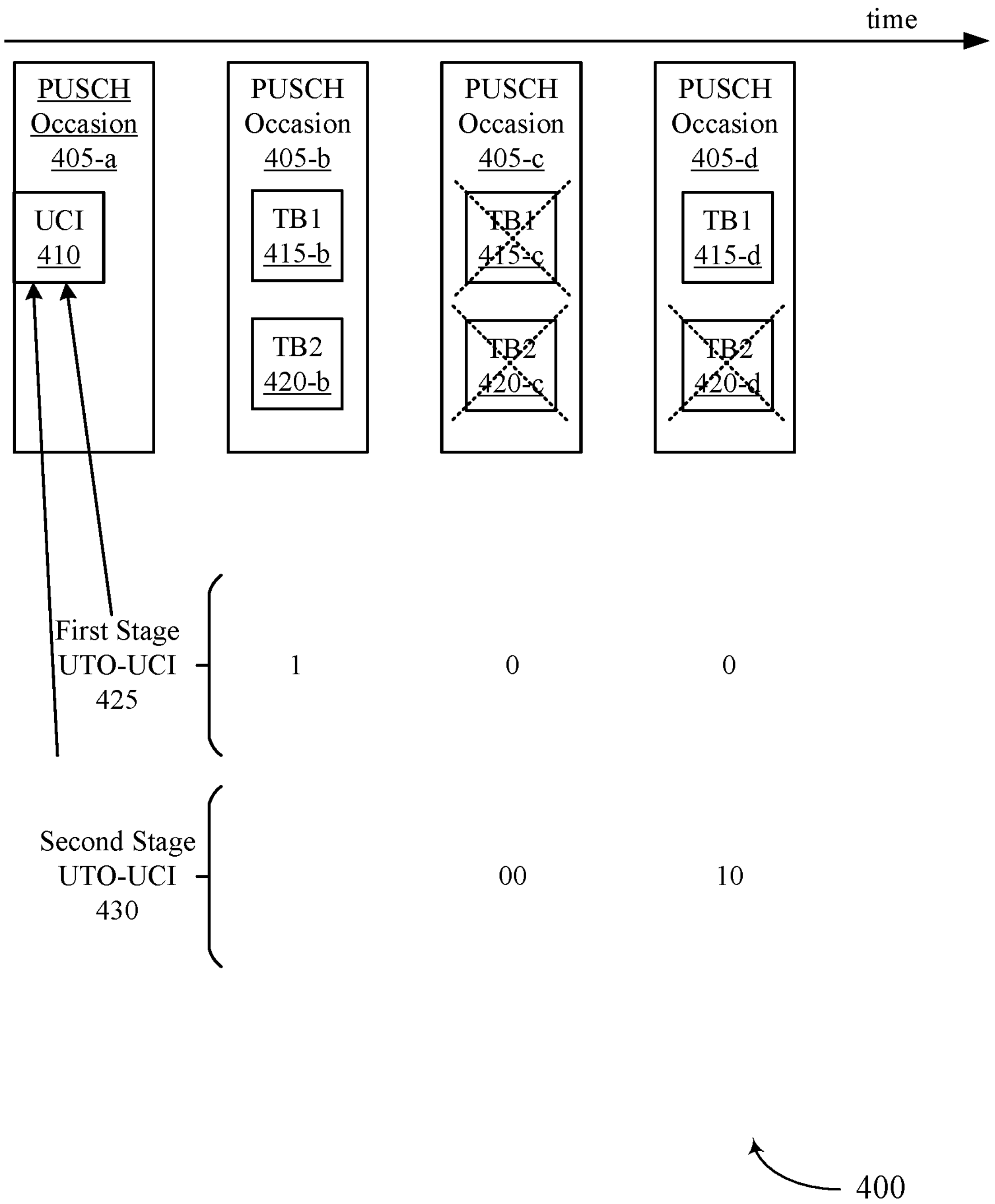
FIG. 4 shows an example of a diagram of a set of uplink transmission occasions that supports unused transmission occasion indication in UCI in accordance with one or more aspects of the present disclosure.

FIG. 4 shows an example of a diagram 400 of a set of uplink transmission occasions that supports unused transmission occasion indication in UCI in accordance with one or more aspects of the present disclosure. The diagram 400 of a set of uplink transmission occasions may implement or may be implemented by the wireless communications system 100 or the wireless communications system 300.

A UE 115 may be scheduled with a set of CG PUSCH occasions 405 (e.g., a CG PUSCH occasion 405-*a*, a CG PUSCH occasion 405-*b*, a CG PUSCH occasion 405-*c*, and a CG PUSCH occasion 405-*d*), for example, via control signaling 315 as described with reference to FIG. 3. Each CG PUSCH occasion 405 may be configured for transmission of two TBs (e.g., the CG PUSCH occasion 405-*b* may be configured for transmission of a first TB 415-*b* and a second TB 420-*b*, the CG PUSCH occasion 405-*c* may be configured for transmission of a first TB 415-*c* and a second TB 420-*c*, and the CG PUSCH occasion 405-*d* may be configured for transmission of a first TB 415-*d* and a second TB 420-*d*). The UE 115 may use a two stage indication in the UCI 410 in the CG PUSCH occasion 405-*a* to indicate whether the UE 115 expects to transmit each of the TBs in the remaining three CG PUSCH occasions 405.

For example, the first stage UTO-UCI 425 may indicate whether or not at least one TB in a corresponding CG PUSCH occasion 405 is skipped (e.g., whether the UE 115 expects to not use at least one TB in a corresponding CG PUSCH occasion 405). For example, a value of "1" in the first stage UTO-UCI 425 may indicate the UE 115 expects to transmit both TBs for the corresponding CG PUSCH occasion 405, and a value of "0" may indicate the UE 115 does not expect to transmit at least one of the TBs for the corresponding CG PUSCH occasion 405.

The second stage UTO-UCI 430 may indicate, for each CG PUSCH occasion 405 that the first stage UTO-UCI 425 indicates that the UE 115 expects to not transmit at least one of the TBs, which TB(s) the UE 115 does not expect to transmit. For example, a value of "1" in the second stage UTO-UCI 430 may indicate that the UE 115 expects to transmit the corresponding TB and a value of "0" in the second stage UTO-UCI 430 may indicate that the UE 115 does not expect to transmit the corresponding TB. Accordingly for each CG PUSCH occasion 405, the UE 115 may indicate in the UCI 410 (e.g., via the first stage UTO-UCI 425 and the second stage UTO-UCI 430) whether both TBs are expected to be transmitted, if the first TB 415 is expected to be transmitted and the second TB 420 is not expected to be transmitted, if the first TB 415 is not expected to be transmitted and the second TB 420 is expected to be transmitted, or if neither the first TB 415 nor the second TB 420 are expected to be transmitted. In some cases, only three states may be possible, as in some examples, the UE 115 may not be capable of transmitting the second TB 420 and not transmitting the first TB 415, and in such cases, the corresponding value of the second stage UTO-UCI 430 (e.g., "01") may be reserved.

For example, as shown in FIG. 4, the first stage UTO-UCI 425 in the UCI 410 may include a value of "1" for the CG PUSCH occasion 405-*b*, indicating that the UE 115 expects to transmit the first TB 415-*b* and the second TB 420-*b* in the CG PUSCH occasion 405-*b*. As the first stage UTO-UCI 425 in the UCI 410 indicates that the UE 115 expects to transmit the first TB 415-*b* and the second TB 420-*b*, a second stage UTO-UCI 430 indication is not included for the CG PUSCH occasion 405-*b*. The first stage UTO-UCI 425 in the UCI 410 may include a value of "0" for the CG PUSCH occasion 405-*c*, indicating that the UE 115 does not expect to transmit at least one of the first TB 415-*c* and the second TB 420-*c*. The second stage UTO-UCI 430 includes a value of "00," indicating that the UE 115 does not expect to transmit the first TB 415-*c* and the second TB 420-*c*. The first stage UTO-UCI 425 in the UCI 410 may include a value of "0" for the CG PUSCH occasion 405-*d*, indicating that the UE 115 does not expect to transmit at least one of the first TB 415-*d* and the second TB 420-*d*. The second stage UTO-UCI 430 includes a value of "10," indicating that the UE 115 expects to transmit the first TB 415-*d* and that the UE 115 does not expect to transmit the second TB 420-*d*.

In some examples, the second stage UTO-UCI 430 may be appended to the first stage UTO-UCI 425 and transmitted on a PUSCH jointly encoded and multiplexed in the CG PUSCH occasion 405-*a*.

Figure 5:
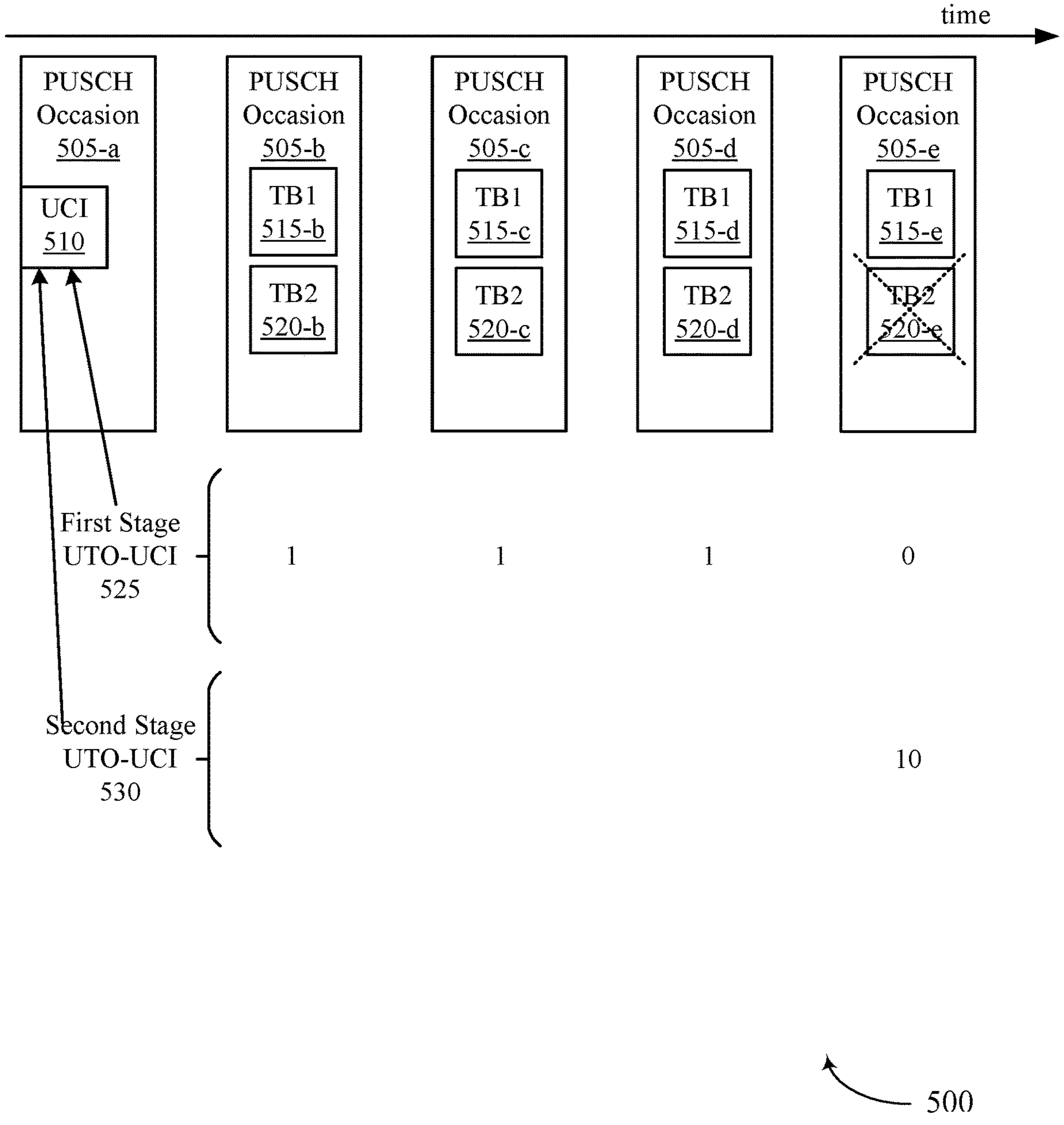
FIG. 5 shows an example of a diagram of a set of uplink transmission occasions that supports unused transmission occasion indication in UCI in accordance with one or more aspects of the present disclosure.

FIG. 5 shows an example of a diagram 500 of a set of uplink transmission occasions that supports unused transmission occasion indication in UCI in accordance with one or more aspects of the present disclosure. The diagram 500 of a set of uplink transmission occasions may implement or may be implemented by the wireless communications system 100 or the wireless communications system 300.

FIG. 5 shows another example of a two stage indication. As described herein, a UE 115 may be scheduled with a set of CG PUSCH occasions 505 (e.g., a CG PUSCH occasion 505-*a*, a CG PUSCH occasion 505-*b*, a CG PUSCH occasion 505-*c*, a CG PUSCH occasion 505-*d*, and a CG PUSCH occasion 505-*e*), for example, via control signaling 315 as described with reference to FIG. 3. Each CG PUSCH occasion 505 may be configured for transmission of two TBs (e.g., the CG PUSCH occasion 505-*b* may be configured for transmission of a first TB 515-*b* and a second TB 520-*b*, the CG PUSCH occasion 505-*c* may be configured for transmission of a first TB 515-*c* and a second TB 520-*c*, the CG PUSCH occasion 505-*d* may be configured for transmission of a first TB 515-*d* and a second TB 520-*d*, and the CG PUSCH occasion 505-*e* may be configured for transmission of a first TB 515-*e* and a second TB 520-*e*). The UE 115 may use the two stage indication in the UCI 510 in the CG PUSCH occasion 505-*a* to indicate whether the UE 115 expects to transmit each of the TBs in the remaining four CG PUSCH occasions 505.

For example, the first stage UTO-UCI 525 may indicate whether or not at least one TB in a corresponding CG PUSCH occasion 505 is skipped (e.g., whether the UE 115 expects to not use at least one TB in a corresponding CG PUSCH occasion 505). For example, a value of "1" in the first stage UTO-UCI 525 may indicate the UE 115 expects to transmit both TBs for the corresponding CG PUSCH occasion 505, and a value of "0" may indicate the UE 115 does not expect to transmit at least one of the TBs for the corresponding CG PUSCH occasion 505.

The second stage UTO-UCI 530 may indicate, for each CG PUSCH occasion 505 that the first stage UTO-UCI indicates that the UE 115 expects to not transmit at least one of the TBs, which TB(s) the UE 115 does not expect to transmit. For example, a value of "1" in the second stage UTO-UCI 530 may indicate that the UE 115 expects to transmit the corresponding TB and a value of "0" in the second stage UTO-UCI 530 may indicate that the UE 115 does not expect to transmit the corresponding TB. Accordingly for each CG PUSCH occasion 505, the UE 115 may indicate in the UCI 510 (e.g., via the first stage UTO-UCI 525 and the second stage UTO-UCI) whether both TBs are expected to be transmitted, if the first TB 515 is expected to be transmitted and the second TB 520 is not expected to be transmitted, if the first TB 515 is not expected to be transmitted and the second TB 520 is expected to be transmitted, or if neither the first TB 515 nor the second TB 520 are expected to be transmitted.

For example, as shown in FIG. 5, the first stage UTO-UCI 525 in the UCI 510 may include a value of "1" for the CG PUSCH occasion 505-*b*, the CG PUSCH occasion 505-*c*, and the CG PUSCH occasion 505-*d*, indicating that the UE 115 expects to transmit the first TB 515-*b* and the second TB 520-*b* in the CG PUSCH occasion 505-*b*, the first TB 515-*c* and the second TB 520-*c* in the CG PUSCH occasion 505-*c*, and the first TB 515-*d* and the second TB 520-*d* in the CG PUSCH occasion 505-*d*. As the first stage UTO-UCI 525 in the UCI 510 indicates that the UE 115 expects to transmit each of the TBs in the CG PUSCH occasion 505-*b*, the CG PUSCH occasion 505-*c*, and the CG PUSCH occasion 505-*d*, a second stage UTO-UCI 530 indication is not included for the CG PUSCH occasion 505-*b*, the CG PUSCH occasion 505-*c*, and the CG PUSCH occasion 505-*d*. The first stage UTO-UCI 525 in the UCI 510 may include a value of "0" for the CG PUSCH occasion 505-*e*, indicating that the UE 115 does not expect to transmit at least one of the first TB 515-*e* and the second TB 520-*e*. The second stage UTO-UCI 530 includes a value of "10," indicating that the UE 115 expects to transmit the first TB 515-*e* and that the UE 115 does not expect to transmit the second TB 520-*e*.

Figure 6:
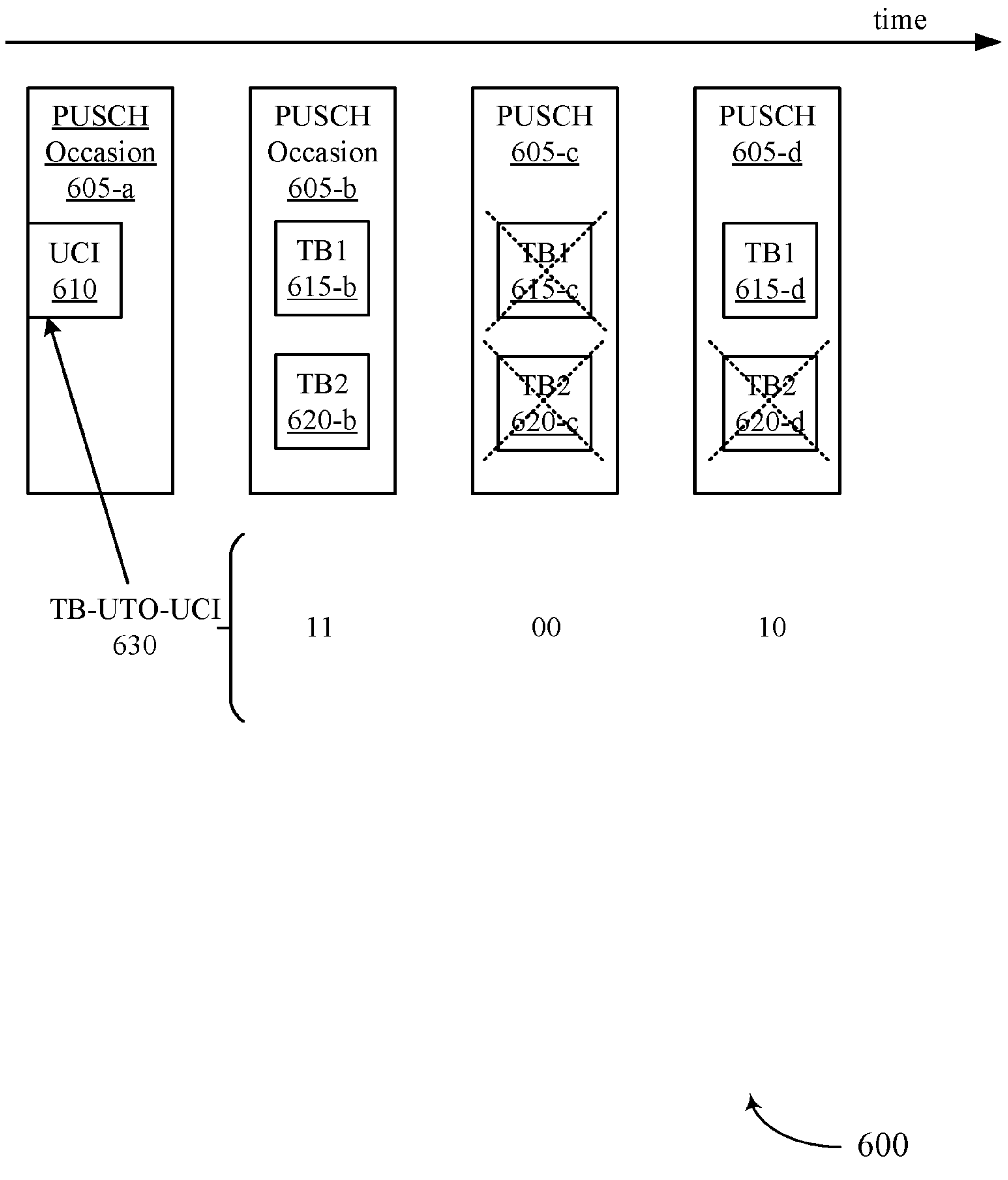
FIG. 6 shows an example of a diagram of a set of uplink transmission occasions that supports unused transmission occasion indication in UCI in accordance with one or more aspects of the present disclosure.

FIG. 6 shows an example of a diagram 600 of a set of uplink transmission occasions that supports unused transmission occasion indication in UCI in accordance with one or more aspects of the present disclosure. The diagram 600 of a set of uplink transmission occasions may implement or may be implemented by the wireless communications system 100 or the wireless communications system 300.

As described herein, a UE 115 may be scheduled with a set of CG PUSCH occasions 605 (e.g., a CG PUSCH occasion 605-*a*, a CG PUSCH occasion 605-*b*, a CG PUSCH occasion 605-*c*, and a CG PUSCH occasion 605-*d*), for example, via control signaling 315 as described with reference to FIG. 3. Each CG PUSCH occasion 605 may be configured for transmission of two TBs (e.g., the CG PUSCH occasion 605-*b* may be configured for transmission of a first TB 615-*b* and a second TB 620-*b*, the CG PUSCH occasion 605-*c* may be configured for transmission of a first TB 615-*c* and a second TB 620-*c*, and the CG PUSCH occasion 605-*d* may be configured for transmission of a first TB 615-*d* and a second TB 620-*d*). FIG. 6 shows an example of a single stage UTO-UCI (referred to as a TB-UTO-UCI 630) which includes a bit for each TB in each CG PUSCH occasion 605.

For example, the TB-UTO-UCI 630 in the UCI 610 in the CG PUSCH occasion 605-*a* may include a value of "11" for the CG PUSCH occasion 605-*b* indicating that the UE 115 expects to transmit the first TB 615-*b* and the second TB 620-*b*, a value of "00" for the CG PUSCH occasion 605-*c* indicating that the UE 115 does not expect to transmit the first TB 615-*c* and the second TB 620-*c*, and a value of "10" for the CG PUSCH occasion 605-*d* indicating that the UE 115 expects to transmit the first TB 615-*d* and does not expect to transmit the second TB 620-*d*.

Figure 7:
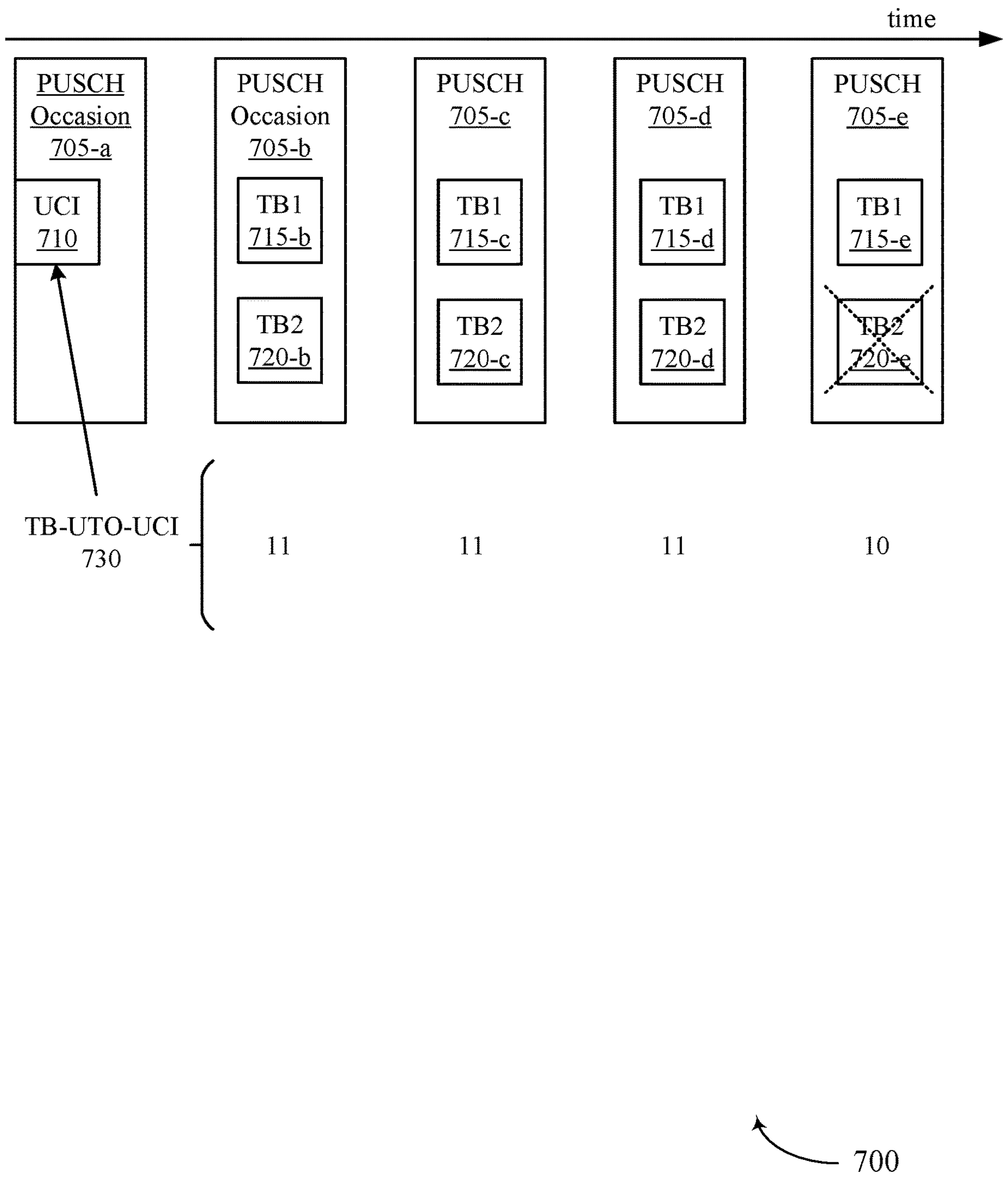
FIG. 7 shows an example of a diagram of a set of uplink transmission occasions that supports unused transmission occasion indication in UCI in accordance with one or more aspects of the present disclosure.

FIG. 7 shows an example of a diagram 700 of a set of uplink transmission occasions that supports unused transmission occasion indication in UCI in accordance with one or more aspects of the present disclosure. The diagram 700 of a set of uplink transmission occasions may implement or may be implemented by the wireless communications system 100 or the wireless communications system 300.

As described herein, a UE 115 may be scheduled with a set of CG PUSCH occasions 705 (e.g., a CG PUSCH occasion 705-*a*, a CG PUSCH occasion 705-*b*, a CG PUSCH occasion 705-*c*, a CG PUSCH occasion 705-*d*, and a CG PUSCH occasion 705-*e*), for example, via control signaling 315 as described with reference to FIG. 3. Each CG PUSCH occasion 705 may be configured for transmission of two TBs (e.g., the CG PUSCH occasion 705-*b* may be configured for transmission of a first TB 715-*b* and a second TB 720-*b*, the CG PUSCH occasion 705-*c* may be configured for transmission of a first TB 715-*c* and a second TB 720-*c*, the CG PUSCH occasion 705-*d* may be configured for transmission of a first TB 715-*d* and a second TB 720-*d*, and the CG PUSCH occasion 705-*e* may be configured for transmission of a first TB 715-*e* and a second TB 720-*e*). FIG. 7 shows another example of a single stage UTO-UCI (referred to as a TB-UTO-UCI 730) which includes a bit for each TB in each CG PUSCH occasion 705.

For example, the TB-UTO-UCI 730 in the UCI 710 in the CG PUSCH occasion 705-*a* may include a value of "11" for the CG PUSCH occasion 705-*b* indicating that the UE 115 expects to transmit the first TB 715-*b* and the second TB 720-*b*, a value of "11" for the CG PUSCH occasion 705-*c* indicating that the UE 115 expects to transmit the first TB 715-*c* and the second TB 720-*c*, a value of "11" for the CG PUSCH occasion 705-*c* indicating that the UE 115 expects to transmit the first TB 715-*d* and the second TB 720-*d*, and a value of "10" for the CG PUSCH occasion 705-*e* indicating that the UE 115 expects to transmit the first TB 715-*e* and does not expect to transmit the second TB 720-*e*.

A two stage indication (e.g., as described with reference to FIGS. 4 and 5) may be more efficient in terms of bit overhead than a single stage indication (e.g., as described with reference to FIGS. 6 and 7) if the UE 115 expects to use most of the CG PUSCH occasions, which may be the case for XR uplink augmented reality video. In an augmented reality use case, the uplink video may have high data rates and most CG PUSCH occasions may be expected to be occupied. Such CG PUSCH occasions may also be occupied for repetition to increase the coverage as uplink augmented reality use cases may suffer from poor coverage.

In some examples, UCI may include a respective bitmap or UTO-UCI for each TB (e.g., the first TB 415 and the second TB 420 in FIG. 4, the first TB 515 and the second TB 520 in FIG. 5, the first TB 615 and the second TB 620 in FIG. 6, and the first TB 715 and the second TB 720 in FIG. 7) across the set of CG PUSCH occasions. Each bitmap size may accordingly be the same size as a UTO-UCI bitmap used where each CG-PUSCH occasion is configured for transmission of a single TB.

Figure 8:
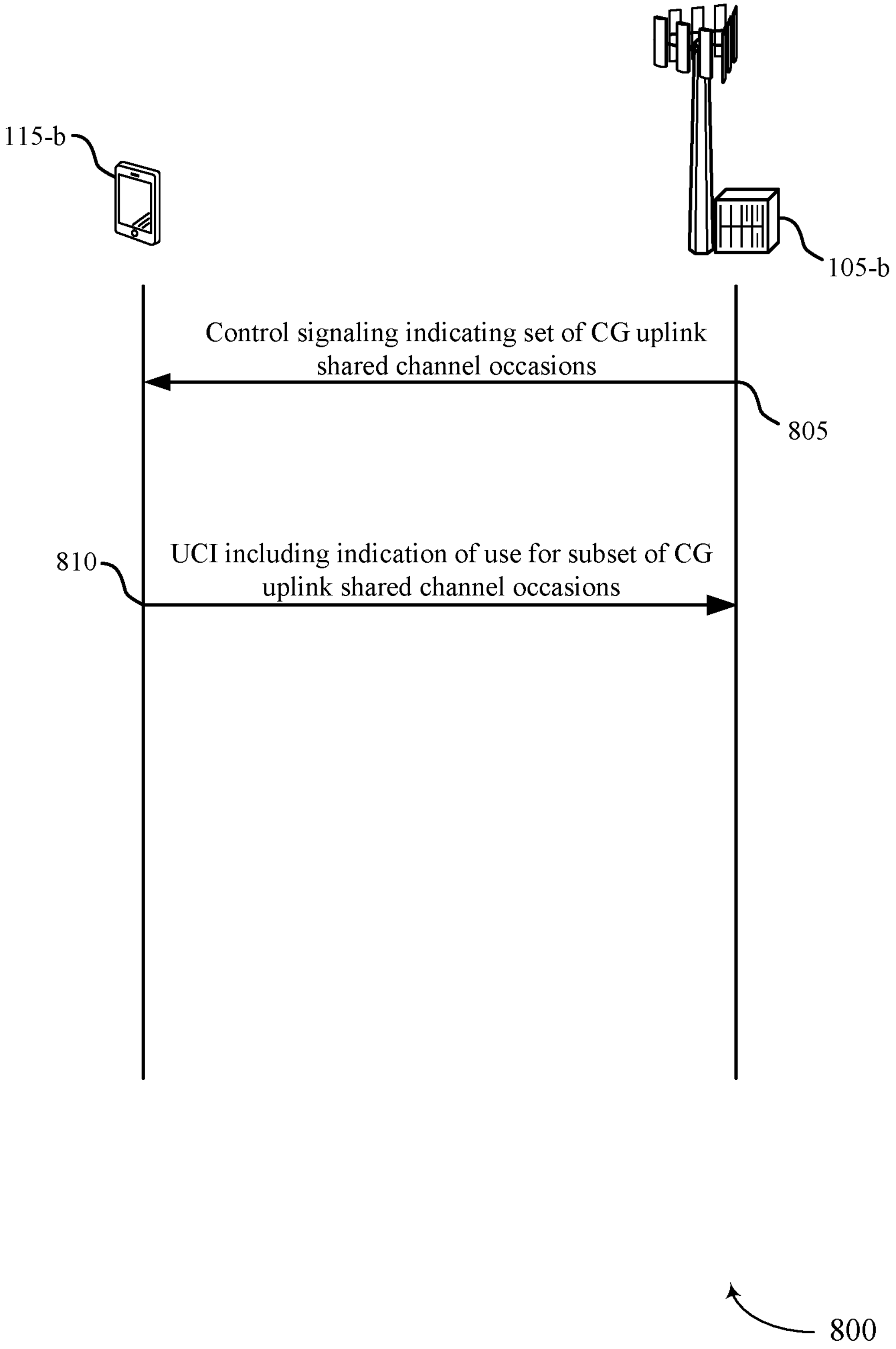
FIG. 8 shows an example of a process flow that supports unused transmission occasion indication in UCI in accordance with one or more aspects of the present disclosure.

FIG. 8 shows an example of a process flow 800 that supports unused transmission occasion indication in UCI in accordance with one or more aspects of the present disclosure. The process flow 800 may implement or be implemented by aspects of wireless communications system 100 or the wireless communications system 300. For example, the process flow 800 may include a UE 115-*b*, which may be an example of a UE 115 as described herein. The process flow 800 may also include a network entity 105-*b*, which may be an example of a network entity 105 as described herein. In the following description of the process flow 800, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 800, and other operations may be added to the process flow 800.

At 805, the UE 115-*b* may receive, from the network entity 105-*b*, control signaling scheduling a set of CG uplink shared channel occasions (e.g., CG PUSCHs), where each CG uplink shared occasion of the set of CG uplink shared channel occasions is configured for transmission of at least two TBs.

At 810, the UE 115-*b* may transmit, to the network entity 105-*b*, UCI including an indication of use for each of the at least two TBs relating to (e.g., with respect to) a subset of the set of CG uplink shared channel occasions.

In some examples, the UE 115-*b* may implement a two-stage indication of use. For example, the indication of use may include a first set of bits identifying one or more CG uplink shared channel occasions of the subset for which the UE 115-*b* expects to transmit fewer than all of the at least two TBs, and the indication of use may further include a second set of bits indicating, for each of the one or more CG uplink shared channel occasions of the subset, one or more TBs that the UE 115-*b* expects to skip of the at least two TBs. As another example, the indication of use may include a first set of bits identifying one or more CG uplink shared channel occasions of the subset for which the UE 115-*b* expects to transmit at least one of the at least two TBs, and the indication of use may further include a second set of bits indicating, for each of the one or more CG uplink shared channel occasions of the subset, one or more TBs that the UE 115-*b* expects to transmit of the at least two TBs.

In some examples, the indication of use may include a bitmap including a respective bit indicating whether the UE 115-*b* expects to transmit each of the at least two TBs for each CG uplink shared channel occasion of the subset. In some examples, the indication of use may include a respective bitmap for each of the at least two TBs, and each respective bitmap may indicate whether the UE 115-*b* expects to transmit the respective TB for each CG uplink shared channel occasion of the subset.

In some examples, the UE 115-*b* may transmit the UCI via a first CG uplink shared channel occasion of the set of CG uplink shared channel occasions. In some examples, the UE 115-*b* may transmit, via a second CG uplink shared channel occasion of the set of CG uplink shared channel occasions subsequent to the first CG uplink shared channel occasion, second UCI including a second indication of use for each of the at least two TBs with respect to a second subset of the set of CG uplink shared channel occasions, where at least one CG uplink shared channel occasion is included in the subset and the second subset. In some examples, the indication of use may indicate that the UE 115-*b* expects to transmit a first TB of the at least one CG uplink shared channel occasion, and the second indication of use may indicate that the UE 115-*b* does not expect to transmit the first TB of the at least one CG uplink shared channel occasion. For example, the UE 115-*b* may determine between the transmission of the first UCI and the second UCI that the UE 115-*b* will not transmit the first TB of the at least one CG uplink shared channel occasion. In some examples, the second indication of use may indicate that the UE 115-*b* does not expect to transmit each TB of each of the at least one CG uplink shared channel occasion that the indication of use indicates that the UE 115-*b* does not expect to transmit. For example, once the UE 115-*b* indicates that the UE 115-*b* does not expect to transmit a given TB, the UE 115-*b* may not be able to indicate in a future UCI that the UE 115-*b* expects to transmit that given TB (e.g., as the network may have already reassigned those resources).

In some examples, the UE 115-*b* may receive, via the control signaling at 805 or via second control signaling from the network entity 105-*b*, an indication of a quantity of uplink shared channel occasions to include in the subset (e.g., how many future CG PUSCH occasions for which to indicate use).

In some examples, the UE 115-*b* may transmit at least one TB in a CG uplink shared channel occasion of the subset, where the indication of use indicates that the UE 115-*b* expects to transmit the at least one TB.

In some examples, the UE 115-*b* may not transmit in any TB that the indication of use indicates the UE 115-*b* does not expect to transmit. For example, the UE 115-*b* may not be allowed to transmit a TB the UE 115-*b* indicated that the UE 115-*b* does not expect to transmit (e.g., as the network may have reassigned those resources).

In some examples, the at least two TBs for each of the set of CG uplink shared channel occasions are spatially division multiplexed.

Figure 9:
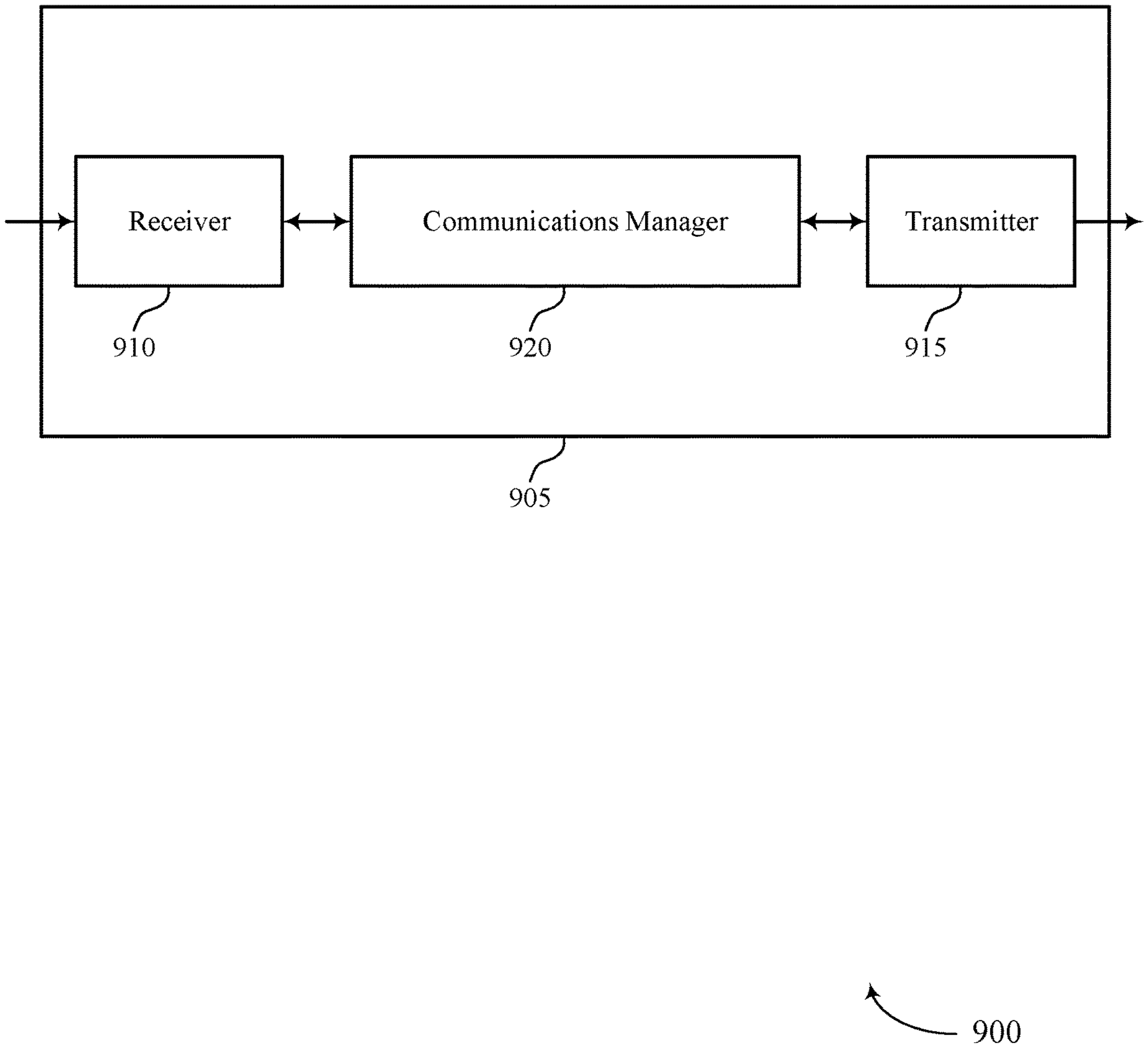
FIGS. 9 and 10 show block diagrams of devices that support unused transmission occasion indication in UCI in accordance with one or more aspects of the present disclosure.

FIG. 9 shows a block diagram 900 of a device 905 that supports unused transmission occasion indication in UCI in accordance with one or more aspects of the present disclosure. The device 905 may be an example of aspects of a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled (e.g., operatively, communicatively, functionally, electronically, or electrically) with at least one memory, to, individually or collectively, support or enable the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to unused transmission occasion indication in UCI). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to unused transmission occasion indication in UCI). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of unused transmission occasion indication in UCI as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a digital signal processor (DSP), a central processing unit (CPU), a graphics processing unit (GPU), a neural processing unit (NPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled (e.g., operatively, communicatively, functionally, electronically, or electrically) with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software) executed (e.g., directly, indirectly, after pre-processing, without pre-processing) by at least one processor. If implemented in code executed by at least one processor, the functions of the communications manager 920, the receiver 910, the transmitter 915, or various combinations or components thereof may be performed by a general-purpose processor, a DSP, a CPU, a GPU, an NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for receiving control signaling scheduling a set of CG uplink shared channel occasions, where each CG uplink shared occasion of the set of CG uplink shared channel occasions is configured for transmission of at least two TBs. The communications manager 920 is capable of, configured to, or operable to support a means for transmitting UCI including an indication of use for each of the at least two TBs relating to a subset of the set of CG uplink shared channel occasions.

By including or configuring the communications manager 920 in accordance with examples as described herein, the device 905 (e.g., at least one processor controlling or otherwise coupled (e.g., operatively, communicatively, functionally, electronically, or electrically) with the receiver 910, the transmitter 915, the communications manager 920, or a combination thereof) may support techniques for more efficient utilization of communication resources.

Figure 10:
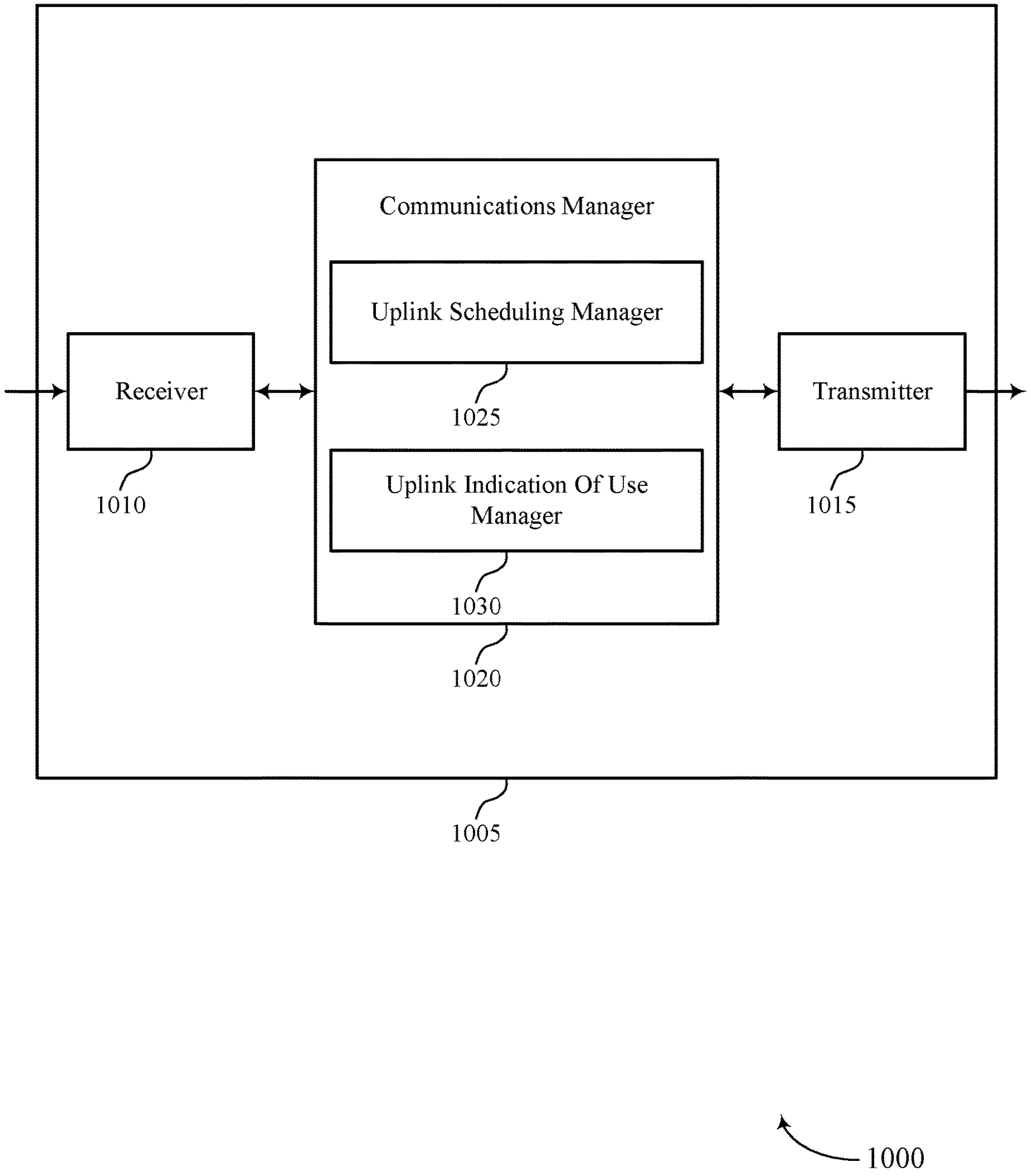

FIG. 10 shows a block diagram 1000 of a device 1005 that supports unused transmission occasion indication in UCI in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled (e.g., operatively, communicatively, functionally, electronically, or electrically) with at least one memory, to support the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to unused transmission occasion indication in UCI). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to unused transmission occasion indication in UCI). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of unused transmission occasion indication in UCI as described herein. For example, the communications manager 1020 may include an uplink scheduling manager 1025 an uplink indication of use manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The uplink scheduling manager 1025 is capable of, configured to, or operable to support a means for receiving control signaling scheduling a set of CG uplink shared channel occasions, where each CG uplink shared occasion of the set of CG uplink shared channel occasions is configured for transmission of at least two TBs. The uplink indication of use manager 1030 is capable of, configured to, or operable to support a means for transmitting UCI including an indication of use for each of the at least two TBs relating to a subset of the set of CG uplink shared channel occasions.

Figure 11:
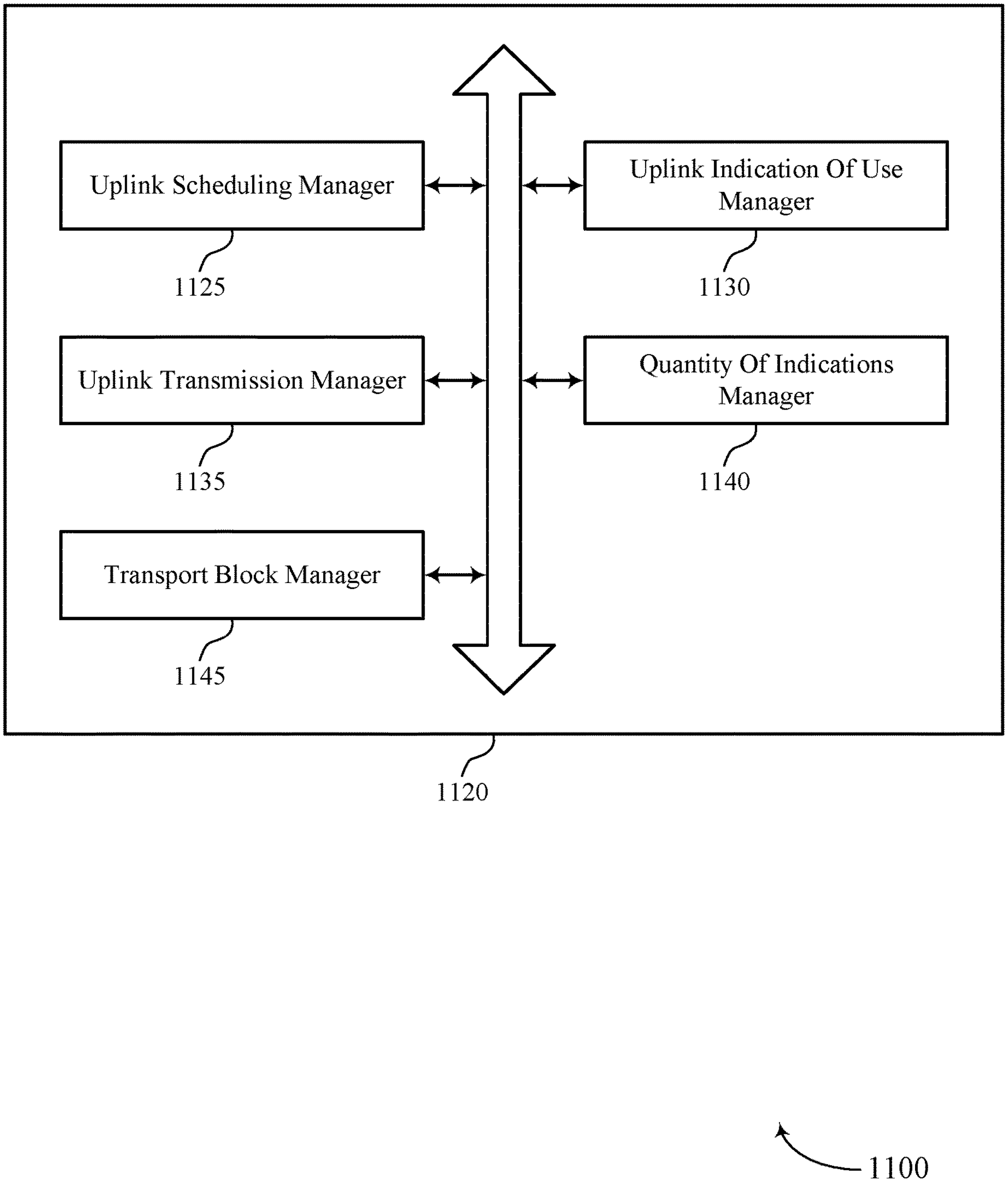
FIG. 11 shows a block diagram of a communications manager that supports unused transmission occasion indication in UCI in accordance with one or more aspects of the present disclosure.

FIG. 11 shows a block diagram 1100 of a communications manager 1120 that supports unused transmission occasion indication in UCI in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of unused transmission occasion indication in UCI as described herein. For example, the communications manager 1120 may include an uplink scheduling manager 1125, an uplink indication of use manager 1130, an uplink transmission manager 1135, a quantity of indications manager 1140, a TB manager 1145, or any combination thereof. Each of these components, or components or subcomponents thereof (e.g., one or more processors, one or more memories), may communicate, directly or indirectly, with one another (e.g., via one or more buses).

The communications manager 1120 may support wireless communications in accordance with examples as disclosed herein. The uplink scheduling manager 1125 is capable of, configured to, or operable to support a means for receiving control signaling scheduling a set of CG uplink shared channel occasions, where each CG uplink shared occasion of the set of CG uplink shared channel occasions is configured for transmission of at least two TBs. The uplink indication of use manager 1130 is capable of, configured to, or operable to support a means for transmitting UCI including an indication of use for each of the at least two TBs relating to a subset of the set of CG uplink shared channel occasions.

In some examples, the indication of use includes a first set of bits identifying one or more CG uplink shared channel occasions of the subset for which the UE expects to transmit fewer than all of the at least two TBs, and the indication of use further includes a second set of bits indicating, for each of the one or more CG uplink shared channel occasions of the subset, one or more TBs that the UE expects to skip of the at least two TBs.

In some examples, the indication of use includes a first set of bits identifying one or more CG uplink shared channel occasions of the subset for which the UE expects to transmit at least one of the at least two TBs, and the indication of use further includes a second set of bits indicating, for each of the one or more CG uplink shared channel occasions of the subset, one or more TBs that the UE expects to transmit of the at least two TBs.

In some examples, the indication of use includes a bitmap including a respective bit indicating whether the UE expects to transmit each of the at least two TBs for each CG uplink shared channel occasion of the subset.

In some examples, the indication of use includes a respective bitmap for each of the at least two TBs. In some examples, each respective bitmap indicates whether the UE expects to transmit the respective TB for each CG uplink shared channel occasion of the subset.

In some examples, to support transmitting the UCI, the uplink transmission manager 1135 is capable of, configured to, or operable to support a means for transmitting the UCI via a first CG uplink shared channel occasion of the set of CG uplink shared channel occasions.

In some examples, the uplink indication of use manager 1130 is capable of, configured to, or operable to support a means for transmitting, via a second CG uplink shared channel occasion of the set of CG uplink shared channel occasions subsequent to the first CG uplink shared channel occasion, second UCI including a second indication of use for each of the at least two TBs with respect to a second subset of the set of CG uplink shared channel occasions, where at least one CG uplink shared channel occasion is included in the subset and the second subset.

In some examples, the indication of use indicates that the UE expects to transmit a first transport block of the at least one configured grant uplink shared channel occasion, and the second indication of use indicates that the UE does not expect to transmit the first TB of the at least one CG uplink shared channel occasion.

In some examples, the second indication of use indicates that the UE does not expect to transmit each TB of each of the at least one CG uplink shared channel occasion that the indication of use indicates that the UE does not expect to transmit.

In some examples, the quantity of indications manager 1140 is capable of, configured to, or operable to support a means for receiving, via the control signaling or via second control signaling, an indication of a quantity of uplink shared channel occasions to include in the subset.

In some examples, the TB manager 1145 is capable of, configured to, or operable to support a means for transmitting at least one TB in a CG uplink shared channel occasion of the subset, where the indication of use indicates that the UE expects to transmit the at least one TB.

In some examples, the UE does not transmit in any TB that the indication of use indicates the UE does not expect to transmit.

In some examples, the at least two TBs for each of the set of CG uplink shared channel occasions are spatially division multiplexed.

Figure 12:
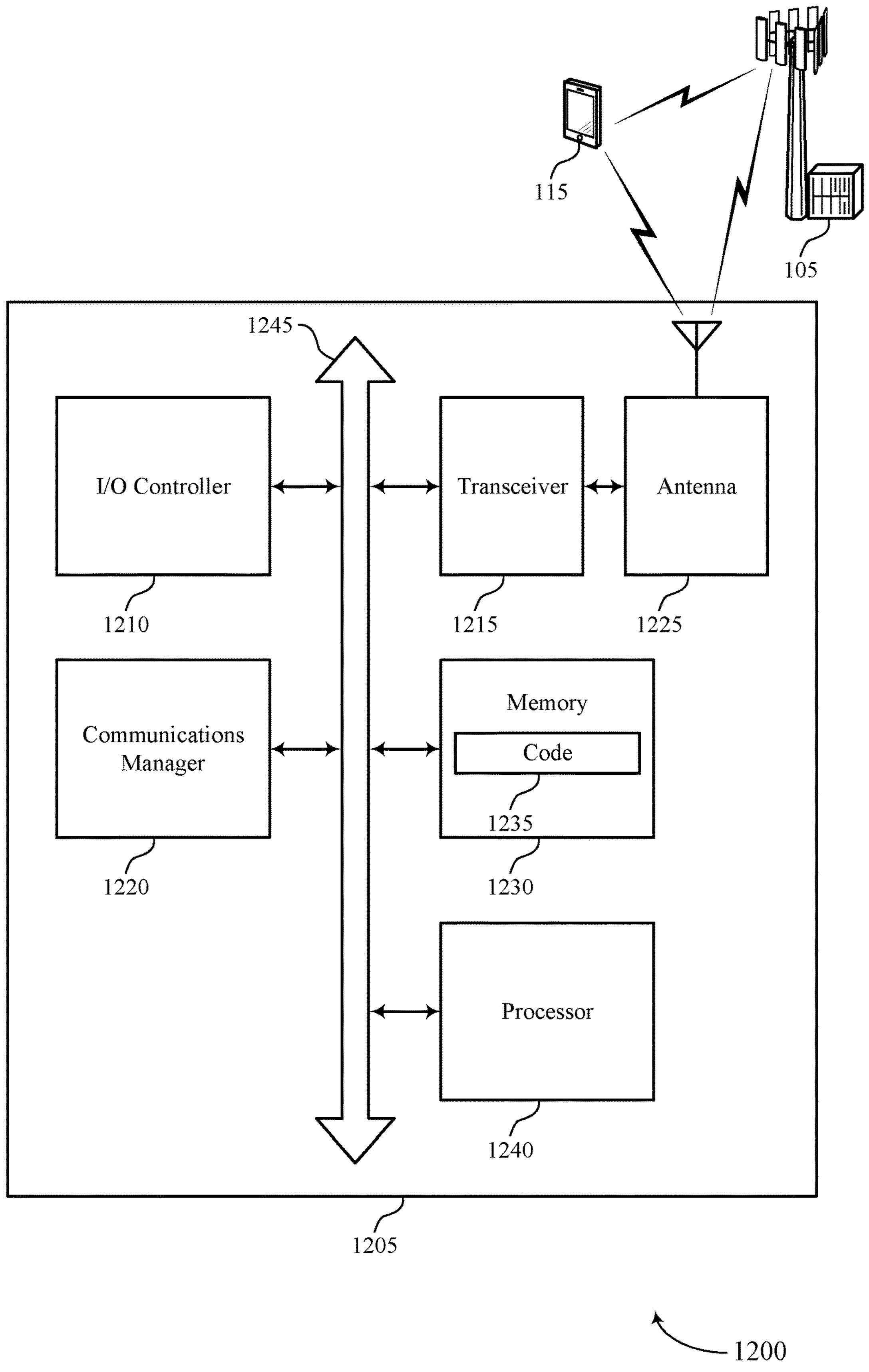
FIG. 12 shows a diagram of a system including a device that supports unused transmission occasion indication in UCI in accordance with one or more aspects of the present disclosure.

FIG. 12 shows a diagram of a system 1200 including a device 1205 that supports unused transmission occasion indication in UCI in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, at least one memory 1230, code 1235, and at least one processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of one or more processors, such as the at least one processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The at least one memory 1230 may include random access memory (RAM) and read-only memory (ROM). The at least one memory 1230 may store computer-readable, computer-executable code 1235 including instructions that, when executed (e.g., directly, indirectly, after pre-processing, without pre-processing) by the at least one processor 1240, cause the device 1205 to perform various functions described herein. The code 1235 may be stored in a non-transitory computer-readable medium such as system memory or another type of memory. In some cases, the code 1235 may not be directly executable by the at least one processor 1240 but may cause a computer (e.g., when compiled and executed) to perform functions described herein. In some cases, the at least one memory 1230 may contain, among other things, a basic I/O system (BIOS) which may control basic hardware or software operation such as the interaction with peripheral components or devices.

The at least one processor 1240 may include an intelligent hardware device (e.g., a general-purpose processor, a DSP, a CPU, a GPU, an NPU, a microcontroller, an ASIC, an FPGA, a programmable logic device, a discrete gate or transistor logic component, a discrete hardware component, or any combination thereof). In some cases, the at least one processor 1240 may be configured to operate a memory array using a memory controller. In some other cases, a memory controller may be integrated into the at least one processor 1240. The at least one processor 1240 may be configured to execute (e.g., directly, indirectly, after pre-processing, without pre-processing) computer-readable instructions stored in a memory (e.g., the at least one memory 1230) to cause the device 1205 to perform various functions (e.g., functions or tasks supporting unused transmission occasion indication in UCI). For example, the device 1205 or a component of the device 1205 may include at least one processor 1240 and at least one memory 1230 coupled (e.g., operatively, communicatively, functionally, electronically, or electrically) with or to the at least one processor 1240, the at least one processor 1240 and at least one memory 1230 configured to perform various functions described herein. In some examples, the at least one processor 1240 may include multiple processors and the at least one memory 1230 may include multiple memories. One or more of the multiple processors may be coupled with one or more of the multiple memories, which may, individually or collectively, be configured to perform various functions herein. In some examples, the at least one processor 1240 may be a component of a processing system, which may refer to a system (such as a series) of machines, circuitry (including, for example, one or both of processor circuitry (which may include the at least one processor 1240) and memory circuitry (which may include the at least one memory 1230)), or components, that receives or obtains inputs and processes the inputs to produce, generate, or obtain a set of outputs. The processing system may be configured to perform one or more of the functions described herein. For example, the at least one processor 1240 or a processing system including the at least one processor 1240 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1230 or otherwise, to perform one or more of the functions described herein.

The communications manager 1220 may support wireless communications in accordance with examples as disclosed herein. For example, the communications manager 1220 is capable of, configured to, or operable to support a means for receiving control signaling scheduling a set of CG uplink shared channel occasions, where each CG uplink shared occasion of the set of CG uplink shared channel occasions is configured for transmission of at least two TBs. The communications manager 1220 is capable of, configured to, or operable to support a means for transmitting UCI including an indication of use for each of the at least two TBs relating to a subset of the set of CG uplink shared channel occasions.

By including or configuring the communications manager 1220 in accordance with examples as described herein, the device 1205 may support techniques for reduced latency, more efficient utilization of communication resources, and improved coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the at least one processor 1240, the at least one memory 1230, the code 1235, or any combination thereof. For example, the code 1235 may include instructions executable (e.g., directly, indirectly, after pre-processing, without pre-processing) by the at least one processor 1240 to cause the device 1205 to perform various aspects of unused transmission occasion indication in UCI as described herein, or the at least one processor 1240 and the at least one memory 1230 may be otherwise configured to, individually or collectively, perform or support such operations.

Figure 13:
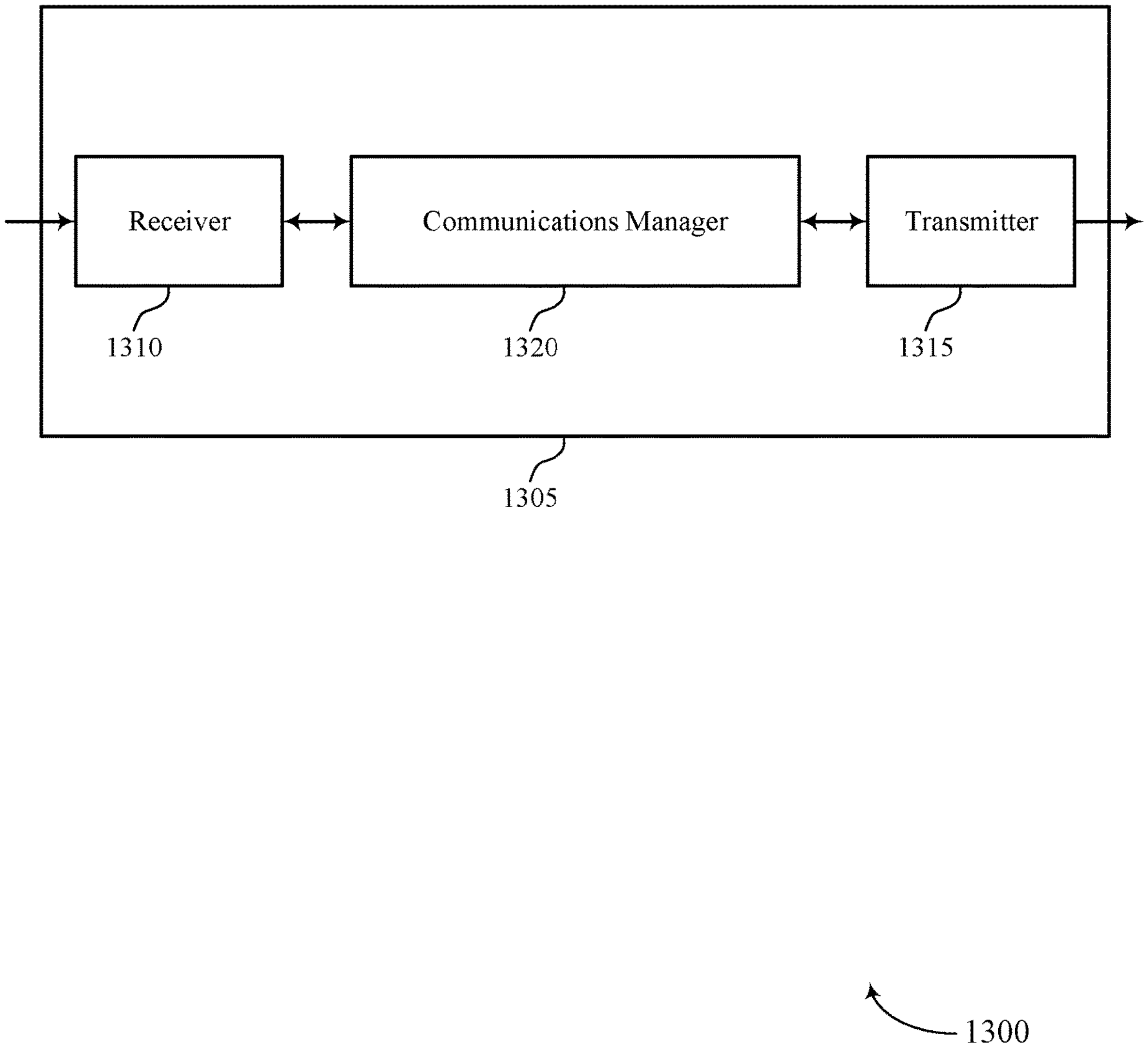
FIGS. 13 and 14 show block diagrams of devices that support unused transmission occasion indication in UCI in accordance with one or more aspects of the present disclosure.

FIG. 13 shows a block diagram 1300 of a device 1305 that supports unused transmission occasion indication in UCI in accordance with one or more aspects of the present disclosure. The device 1305 may be an example of aspects of a network entity 105 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled (e.g., operatively, communicatively, functionally, electronically, or electrically) with at least one memory, to, individually or collectively, support or enable the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of unused transmission occasion indication in UCI as described herein. For example, the communications manager 1320, the receiver 1310, the transmitter 1315, or various combinations or components thereof may be capable of performing one or more of the functions described herein.

In some examples, the communications manager 1320, the receiver 1310, the transmitter 1315, or various combinations or components thereof may be implemented in hardware (e.g., in communications management circuitry). The hardware may include at least one of a processor, a DSP, a CPU, a GPU, an NPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled (e.g., operatively, communicatively, functionally, electronically, or electrically) with the at least one processor may be configured to perform one or more of the functions described herein (e.g., by one or more processors, individually or collectively, executing instructions stored in the at least one memory).

Additionally, or alternatively, the communications manager 1320, the receiver 1310, the transmitter 1315, or various combinations or components thereof may be implemented in code (e.g., as communications management software) executed (e.g., directly, indirectly, after pre-processing, without pre-processing) by at least one processor. If implemented in code executed by at least one processor, the functions of the communications manager 1320, the receiver 1310, the transmitter 1315, or various combinations or components thereof may be performed by a general-purpose processor, a DSP, a CPU, a GPU, an NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. For example, the communications manager 1320 is capable of, configured to, or operable to support a means for outputting, to a UE, control signaling scheduling a set of CG uplink shared channel occasions, where each CG uplink shared occasion of the set of CG uplink shared channel occasions is configured for transmission of at least two TBs. The communications manager 1320 is capable of, configured to, or operable to support a means for obtaining, from the UE, UCI including an indication of use for each of the at least two TBs relating to a subset of the set of CG uplink shared channel occasions.

By including or configuring the communications manager 1320 in accordance with examples as described herein, the device 1305 (e.g., at least one processor controlling or otherwise coupled (e.g., operatively, communicatively, functionally, electronically, or electrically) with the receiver 1310, the transmitter 1315, the communications manager 1320, or a combination thereof) may support techniques for more efficient utilization of communication resources.

Figure 14:
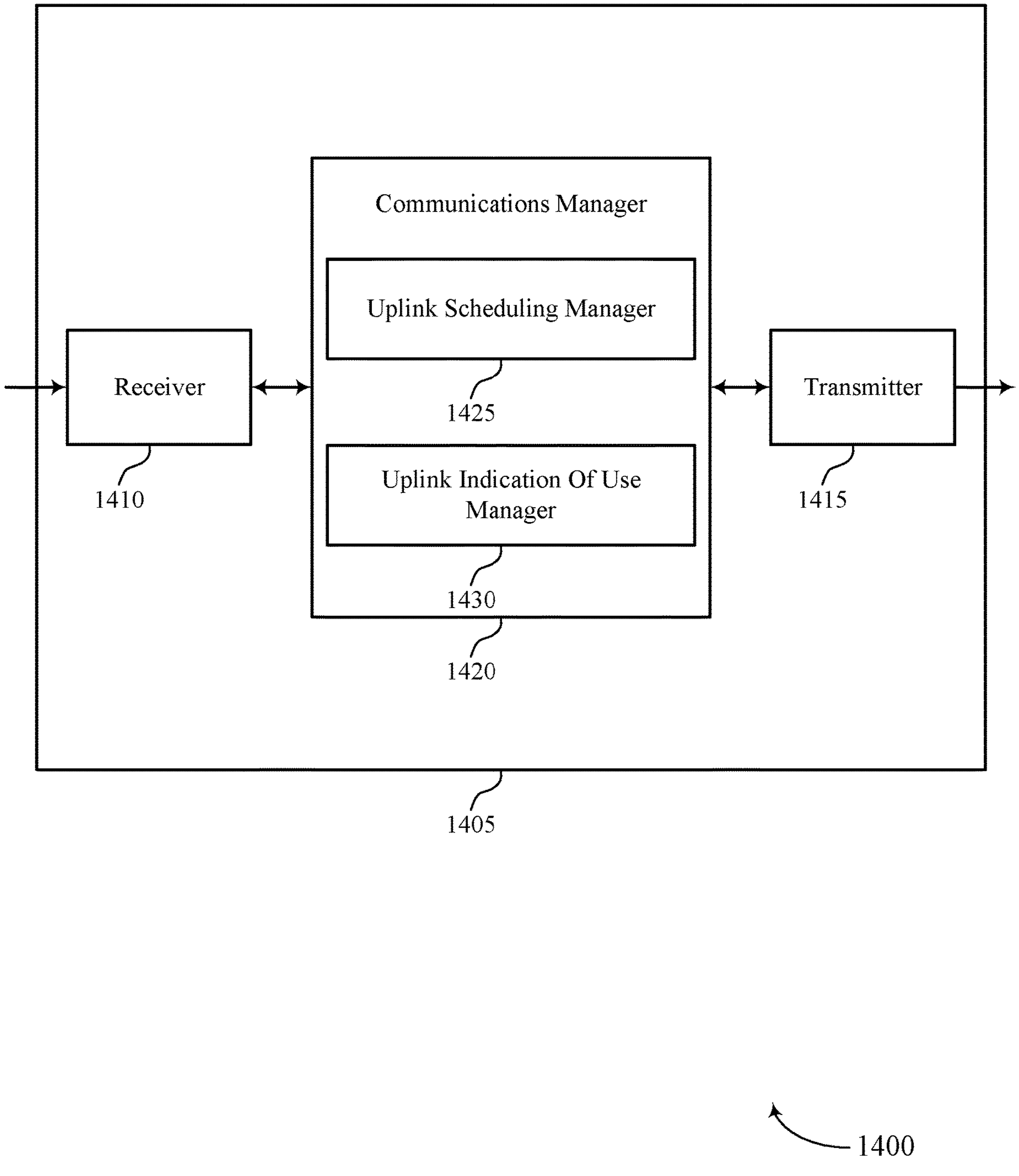

FIG. 14 shows a block diagram 1400 of a device 1405 that supports unused transmission occasion indication in UCI in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405, or one or more components of the device 1405 (e.g., the receiver 1410, the transmitter 1415, and the communications manager 1420), may include at least one processor, which may be coupled (e.g., operatively, communicatively, functionally, electronically, or electrically) with at least one memory, to support the described techniques. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of unused transmission occasion indication in UCI as described herein. For example, the communications manager 1420 may include an uplink scheduling manager 1425 an uplink indication of use manager 1430, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications in accordance with examples as disclosed herein. The uplink scheduling manager 1425 is capable of, configured to, or operable to support a means for outputting, to a UE, control signaling scheduling a set of CG uplink shared channel occasions, where each CG uplink shared occasion of the set of CG uplink shared channel occasions is configured for transmission of at least two TBs. The uplink indication of use manager 1430 is capable of, configured to, or operable to support a means for obtaining, from the UE, UCI including an indication of use for each of the at least two TBs relating to a subset of the set of CG uplink shared channel occasions.

Figure 15:
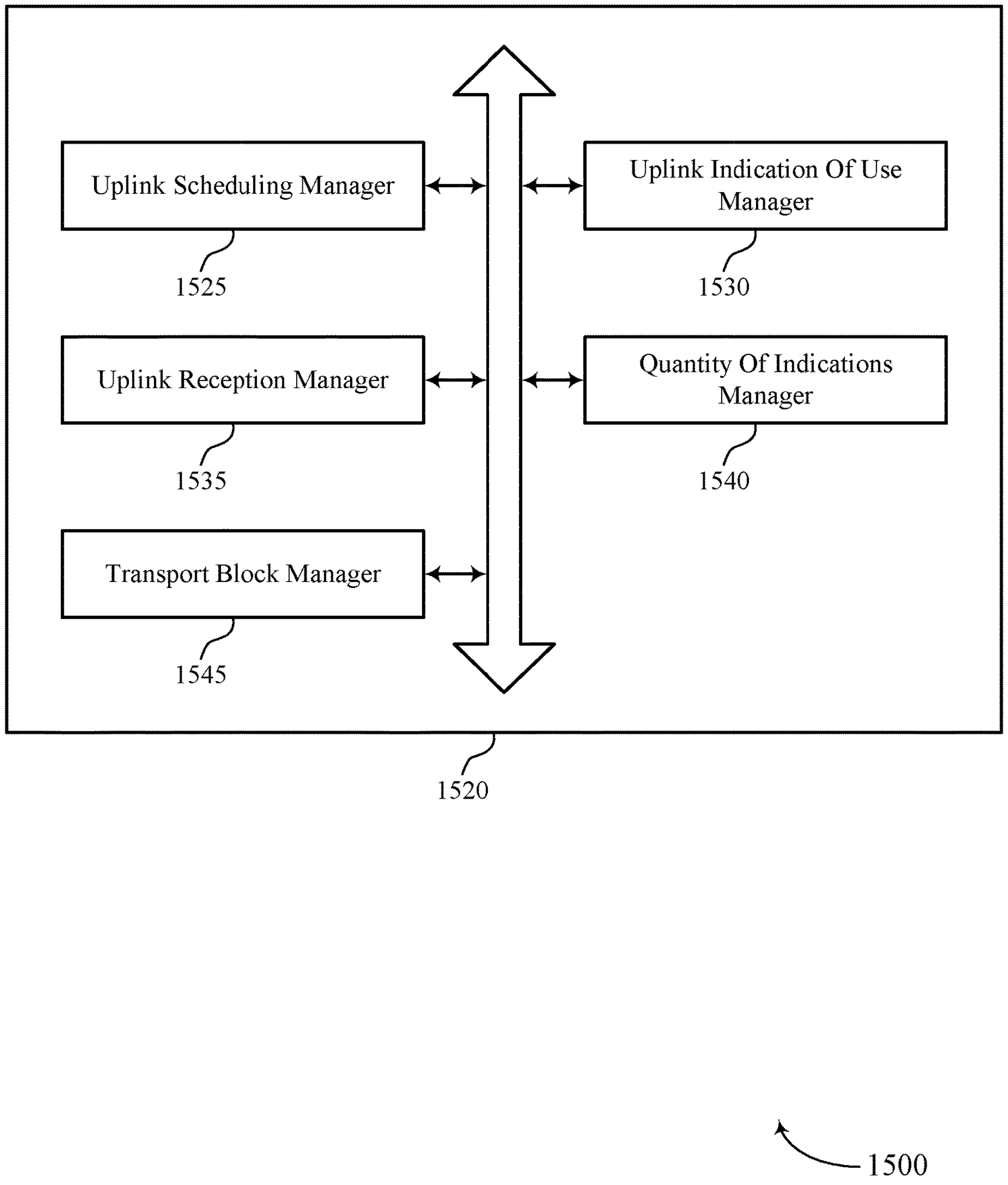
FIG. 15 shows a block diagram of a communications manager that supports unused transmission occasion indication in UCI in accordance with one or more aspects of the present disclosure.

FIG. 15 shows a block diagram 1500 of a communications manager 1520 that supports unused transmission occasion indication in UCI in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of unused transmission occasion indication in UCI as described herein. For example, the communications manager 1520 may include an uplink scheduling manager 1525, an uplink indication of use manager 1530, an uplink reception manager 1535, a quantity of indications manager 1540, a TB manager 1545, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communications in accordance with examples as disclosed herein. The uplink scheduling manager 1525 is capable of, configured to, or operable to support a means for outputting, to a UE, control signaling scheduling a set of CG uplink shared channel occasions, where each CG uplink shared occasion of the set of CG uplink shared channel occasions is configured for transmission of at least two TBs. The uplink indication of use manager 1530 is capable of, configured to, or operable to support a means for obtaining, from the UE, UCI including an indication of use for each of the at least two TBs relating to a subset of the set of CG uplink shared channel occasions.

In some examples, the indication of use includes a first set of bits identifying one or more CG uplink shared channel occasions of the subset for which the UE expects to transmit fewer than all of the at least two TBs, and the indication of use further includes a second set of bits indicating, for each of the one or more CG uplink shared channel occasions of the subset, one or more TBs that the UE expects to skip of the at least two TBs.

In some examples, the indication of use includes a first set of bits identifying one or more CG uplink shared channel occasions of the subset for which the UE expects to transmit at least one of the at least two TBs, and the indication of use further includes a second set of bits indicating, for each of the one or more CG uplink shared channel occasions of the subset, one or more TBs that the UE expects to transmit of the at least two TBs.

In some examples, the indication of use includes a bitmap including a respective bit indicating whether the UE expects to transmit each of the at least two TBs for each CG uplink shared channel occasion of the subset.

In some examples, the indication of use includes a respective bitmap for each of the at least two TBs. In some examples, each respective bitmap indicates whether the UE expects to transmit the respective TB for each CG uplink shared channel occasion of the subset.

In some examples, to support obtaining the UCI, the uplink reception manager 1535 is capable of, configured to, or operable to support a means for obtaining the UCI via a first CG uplink shared channel occasion of the set of CG uplink shared channel occasions.

In some examples, the uplink indication of use manager 1530 is capable of, configured to, or operable to support a means for obtaining, via a second CG uplink shared channel occasion of the set of CG uplink shared channel occasions subsequent to the first CG uplink shared channel occasion, second UCI including a second indication of use for each of the at least two TBs with respect to a second subset of the set of CG uplink shared channel occasions, where at least one CG uplink shared channel occasion is included in the subset and the second subset.

In some examples, the indication of use indicates that the UE expects to transmit a first TB of the at least one CG uplink shared channel occasion. In some examples, the second indication of use indicates that the UE does not expect to transmit the first TB of the at least one CG uplink shared channel occasion.

In some examples, the second indication of use indicates that the UE does not expect to transmit each TB of each of the at least one CG uplink shared channel occasion that the indication of use indicates that the UE does not expect to transmit.

In some examples, the quantity of indications manager 1540 is capable of, configured to, or operable to support a means for outputting, via the control signaling or via second control signaling, an indication of a quantity of uplink shared channel occasions to include in the subset.

In some examples, the TB manager 1545 is capable of, configured to, or operable to support a means for obtaining, from the UE, at least one TB in a CG uplink shared channel occasion of the subset, where the indication of use indicates that the UE expects to transmit the at least one TB.

In some examples, the at least two TBs for each of the set of CG uplink shared channel occasions are spatially division multiplexed.

Figure 16:
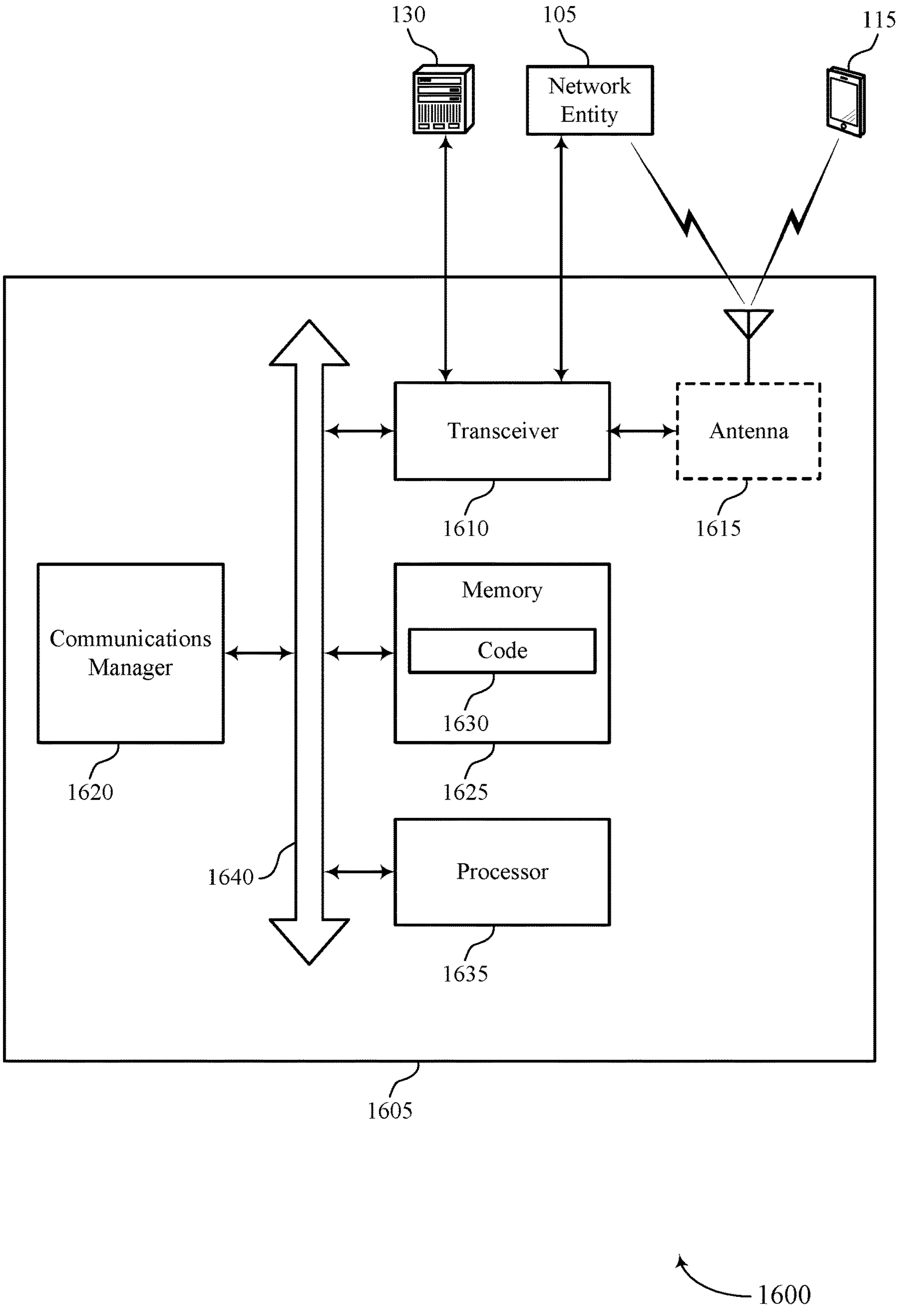
FIG. 16 shows a diagram of a system including a device that supports unused transmission occasion indication in UCI in accordance with one or more aspects of the present disclosure.

FIG. 16 shows a diagram of a system 1600 including a device 1605 that supports unused transmission occasion indication in UCI in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, at least one memory 1625, code 1630, and at least one processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or one or more memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or one or more memory components (e.g., the at least one processor 1635, the at least one memory 1625, or both), may be included in a chip or chip assembly that is installed in the device 1605. In some examples, the transceiver 1610 may be operable to support communications via one or more communications links (e.g., a communication link 125, a backhaul communication link 120, a midhaul communication link 162, a fronthaul communication link 168).

The at least one memory 1625 may include RAM, ROM, or any combination thereof. The at least one memory 1625 may store computer-readable, computer-executable code 1630 including instructions that, when executed (e.g., directly, indirectly, after pre-processing, without pre-processing) by one or more of the at least one processor 1635, cause the device 1605 to perform various functions described herein. The code 1630 may be stored in a non-transitory computer-readable medium such as system memory or another type of memory. In some cases, the code 1630 may not be directly executable by a processor of the at least one processor 1635 but may cause a computer (e.g., when compiled and executed) to perform functions described herein. In some cases, the at least one memory 1625 may contain, among other things, a BIOS which may control basic hardware or software operation such as the interaction with peripheral components or devices. In some examples, the at least one processor 1635 may include multiple processors and the at least one memory 1625 may include multiple memories. One or more of the multiple processors may be coupled (e.g., operatively, communicatively, functionally, electronically, or electrically) with one or more of the multiple memories which may, individually or collectively, be configured to perform various functions herein (for example, as part of a processing system).

The at least one processor 1635 may include an intelligent hardware device (e.g., a general-purpose processor, a DSP, an ASIC, a CPU, a GPU, an NPU, an FPGA, a microcontroller, a programmable logic device, discrete gate or transistor logic, a discrete hardware component, or any combination thereof). In some cases, the at least one processor 1635 may be configured to operate a memory array using a memory controller. In some other cases, a memory controller may be integrated into one or more of the at least one processor 1635. The at least one processor 1635 may be configured to execute (e.g., directly, indirectly, after pre-processing, without pre-processing) computer-readable instructions stored in a memory (e.g., one or more of the at least one memory 1625) to cause the device 1605 to perform various functions (e.g., functions or tasks supporting unused transmission occasion indication in UCI). For example, the device 1605 or a component of the device 1605 may include at least one processor 1635 and at least one memory 1625 coupled (e.g., operatively, communicatively, functionally, electronically, or electrically) with one or more of the at least one processor 1635, the at least one processor 1635 and the at least one memory 1625 configured to perform various functions described herein. The at least one processor 1635 may be an example of a cloud-computing platform (e.g., one or more physical nodes and supporting software such as operating systems, virtual machines, or container instances) that may host the functions (e.g., by executing code 1630) to perform the functions of the device 1605. The at least one processor 1635 may be any one or more suitable processors capable of executing scripts or instructions of one or more software programs stored in the device 1605 (such as within one or more of the at least one memory 1625). In some examples, the at least one processor 1635 may include multiple processors and the at least one memory 1625 may include multiple memories. One or more of the multiple processors may be coupled (e.g., operatively, communicatively, functionally, electronically, or electrically) with one or more of the multiple memories, which may, individually or collectively, be configured to perform various functions herein. In some examples, the at least one processor 1635 may be a component of a processing system, which may refer to a system (such as a series) of machines, circuitry (including, for example, one or both of processor circuitry (which may include the at least one processor 1635) and memory circuitry (which may include the at least one memory 1625)), or components, that receives or obtains inputs and processes the inputs to produce, generate, or obtain a set of outputs. The processing system may be configured to perform one or more of the functions described herein. For example, the at least one processor 1635 or a processing system including the at least one processor 1635 may be configured to, configurable to, or operable to cause the device 1605 to perform one or more of the functions described herein. Further, as described herein, being "configured to," being "configurable to," and being "operable to" may be used interchangeably and may be associated with a capability, when executing code stored in the at least one memory 1625 or otherwise, to perform one or more of the functions described herein.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the at least one memory 1625, the code 1630, and the at least one processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communications in accordance with examples as disclosed herein. For example, the communications manager 1620 is capable of, configured to, or operable to support a means for outputting, to a UE, control signaling scheduling a set of CG uplink shared channel occasions, where each CG uplink shared occasion of the set of CG uplink shared channel occasions is configured for transmission of at least two TBs. The communications manager 1620 is capable of, configured to, or operable to support a means for obtaining, from the UE, UCI including an indication of use for each of the at least two TBs relating to a subset of the set of CG uplink shared channel occasions.

By including or configuring the communications manager 1620 in accordance with examples as described herein, the device 1605 may support techniques for reduced latency, more efficient utilization of communication resources, and improved coordination between devices.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, one or more of the at least one processor 1635, one or more of the at least one memory 1625, the code 1630, or any combination thereof (for example, by a processing system including at least a portion of the at least one processor 1635, the at least one memory 1625, the code 1630, or any combination thereof). For example, the code 1630 may include instructions executable by one or more of the at least one processor 1635 to cause the device 1605 to perform various aspects of unused transmission occasion indication in UCI as described herein, or the at least one processor 1635 and the at least one memory 1625 may be otherwise configured to, individually or collectively, perform or support such operations.

Figure 17:
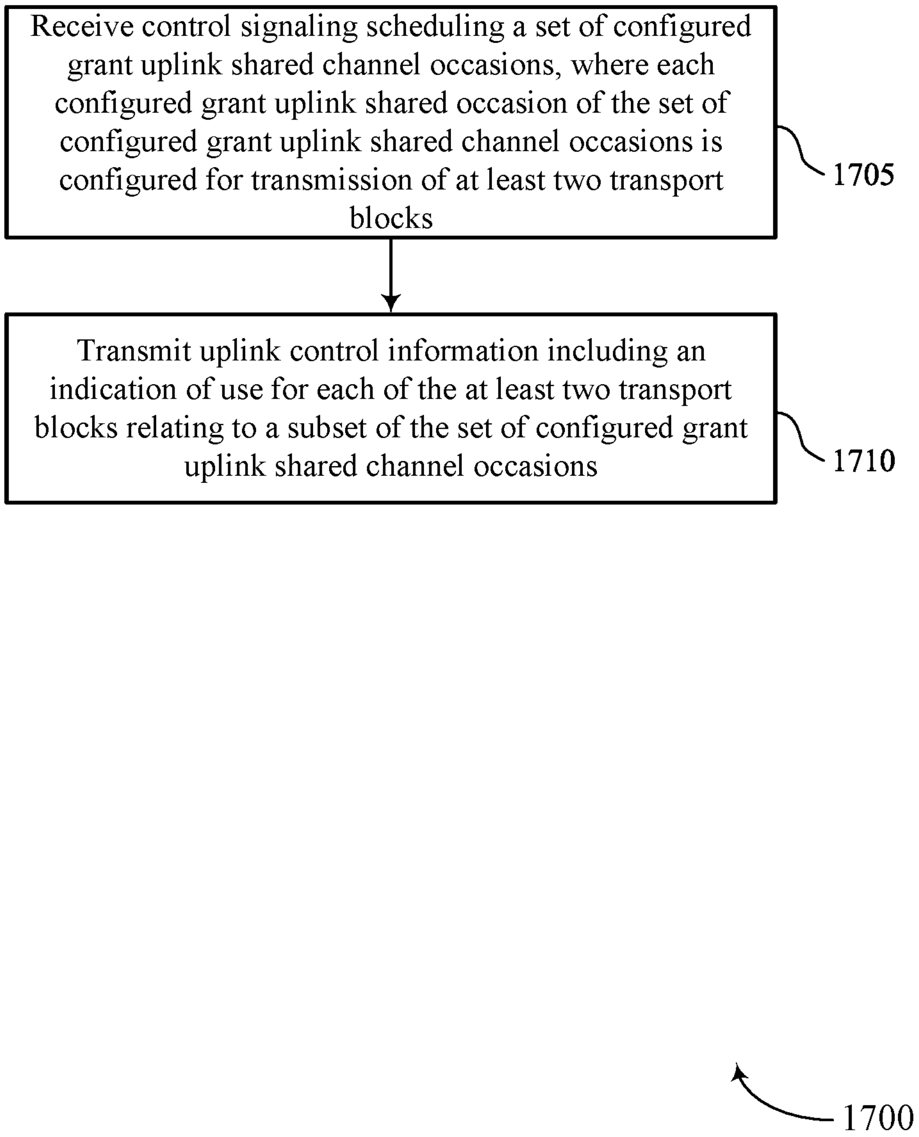
FIGS. 17 and 18 show flowcharts illustrating methods that support unused transmission occasion indication in UCI in accordance with one or more aspects of the present disclosure.

FIG. 17 shows a flowchart illustrating a method 1700 that supports unused transmission occasion indication in UCI in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute (e.g., directly, indirectly, after pre-processing, without pre-processing) a set of instructions to control the functional elements of the UE to perform the described functions. Additionally, or alternatively, the UE may perform aspects of the described functions using special-purpose hardware.

At 1705, the method may include receiving control signaling scheduling a set of CG uplink shared channel occasions, where each CG uplink shared occasion of the set of CG uplink shared channel occasions is configured for transmission of at least two TBs. The operations of block 1705 may be performed in accordance with examples as disclosed herein. In some examples, aspects of the operations of 1705 may be performed by an uplink scheduling manager 1125 as described with reference to FIG. 11.

At 1710, the method may include transmitting UCI including an indication of use for each of the at least two TBs relating to a subset of the set of CG uplink shared channel occasions. The operations of block 1710 may be performed in accordance with examples as disclosed herein. In some examples, aspects of the operations of 1710 may be performed by an uplink indication of use manager 1130 as described with reference to FIG. 11.

Figure 18:
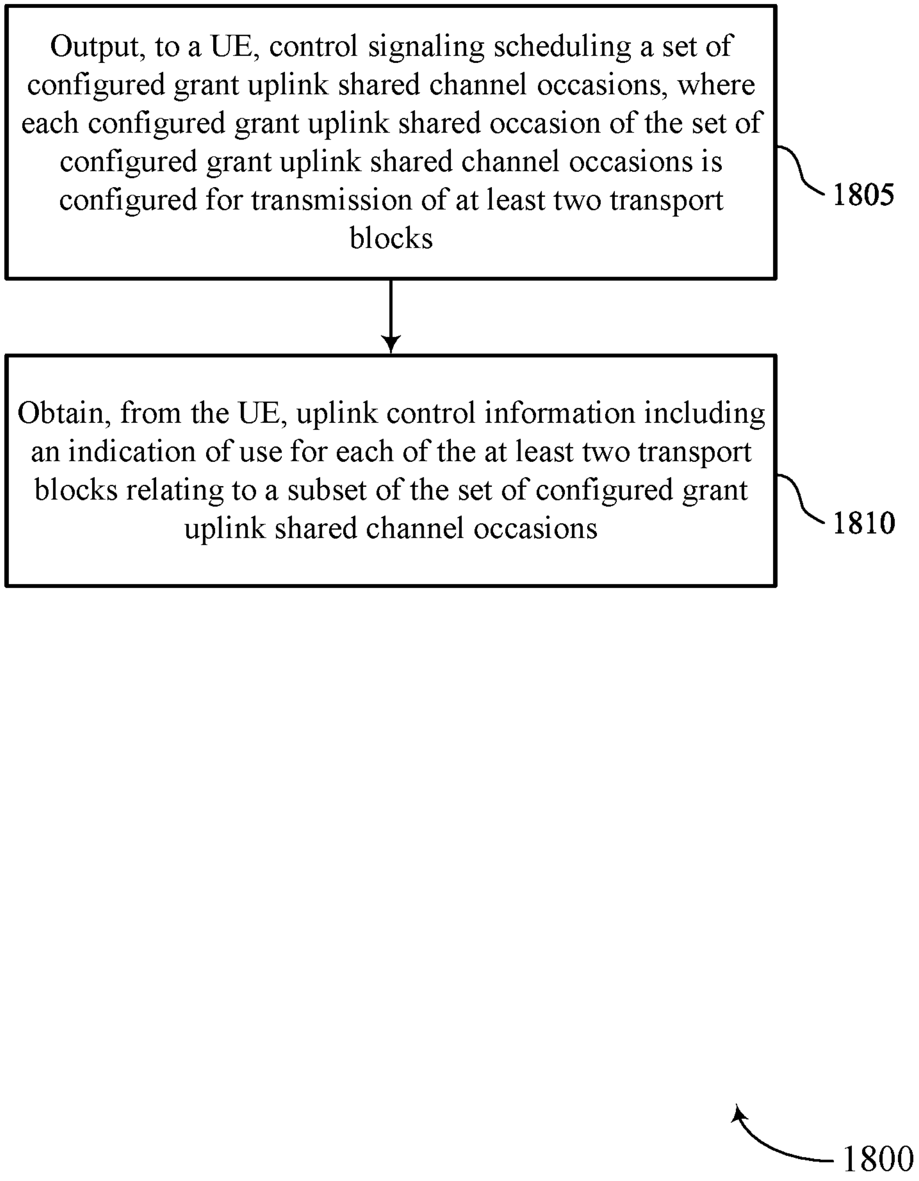

FIG. 18 shows a flowchart illustrating a method 1800 that supports unused transmission occasion indication in UCI in accordance with aspects of the present disclosure. The operations of the method 1800 may be implemented by a network entity or its components as described herein. For example, the operations of the method 1800 may be performed by a network entity as described with reference to FIGS. 1 through 8 and 13 through 16. In some examples, a network entity may execute (e.g., directly, indirectly, after pre-processing, without pre-processing) a set of instructions to control the functional elements of the network entity to perform the described functions. Additionally, or alternatively, the network entity may perform aspects of the described functions using special-purpose hardware.

At 1805, the method may include outputting, to a UE, control signaling scheduling a set of CG uplink shared channel occasions, where each CG uplink shared occasion of the set of CG uplink shared channel occasions is configured for transmission of at least two TBs. The operations of block 1805 may be performed in accordance with examples as disclosed herein. In some examples, aspects of the operations of 1805 may be performed by an uplink scheduling manager 1525 as described with reference to FIG. 15.

At 1810, the method may include obtaining, from the UE, UCI including an indication of use for each of the at least two TBs relating to a subset of the set of CG uplink shared channel occasions. The operations of block 1810 may be performed in accordance with examples as disclosed herein. In some examples, aspects of the operations of 1810 may be performed by an uplink indication of use manager 1530 as described with reference to FIG. 15.

The following provides an overview of aspects of the present disclosure:

Aspect 1: A method for wireless communications at a UE, comprising: receiving control signaling scheduling a set of CG uplink shared channel occasions, wherein each CG uplink shared occasion of the set of CG uplink shared channel occasions is configured for transmission of at least two TBs, and transmitting UCI comprising an indication of use for each of the at least two TBs relating to a subset of the set of CG uplink shared channel occasions.

Aspect 2: The method of aspect 1, wherein the indication of use comprises a first set of bits identifying one or more CG uplink shared channel occasions of the subset for which the UE expects to transmit fewer than all of the at least two TBs, and the indication of use further comprises a second set of bits indicating, for each of the one or more CG uplink shared channel occasions of the subset, one or more TBs that the UE expects to skip of the at least two TBs.

Aspect 3: The method of aspect 1, wherein the indication of use comprises a first set of bits identifying one or more CG uplink shared channel occasions of the subset for which the UE expects to transmit at least one of the at least two TBs, and the indication of use further comprises a second set of bits indicating, for each of the one or more CG uplink shared channel occasions of the subset, one or more TBs that the UE expects to transmit of the at least two TBs.

Aspect 4: The method of aspect 1, wherein the indication of use comprises a bitmap comprising a respective bit indicating whether the UE expects to transmit each of the at least two TBs for each CG uplink shared channel occasion of the subset.

Aspect 5: The method of aspect 1, wherein the indication of use comprises a respective bitmap for each of the at least two TBs, and each respective bitmap indicates whether the UE expects to transmit the respective TB for each CG uplink shared channel occasion of the subset.

Aspect 6: The method of any of aspects 1 through 5, wherein transmitting the UCI comprises: transmitting the UCI via a first CG uplink shared channel occasion of the set of CG uplink shared channel occasions.

Aspect 7: The method of aspect 6, further comprising: transmitting, via a second CG uplink shared channel occasion of the set of CG uplink shared channel occasions subsequent to the first CG uplink shared channel occasion, second UCI comprising a second indication of use for each of the at least two TBs with respect to a second subset of the set of CG uplink shared channel occasions, wherein at least one CG uplink shared channel occasion is included in the subset and the second subset.

Aspect 8: The method of aspect 7, wherein the indication of use indicates that the UE expects to transmit a first TB of the at least one CG uplink shared channel occasion, and the second indication of use indicates that the UE does not expect to transmit the first TB of the at least one CG uplink shared channel occasion.

Aspect 9: The method of any of aspects 7 through 8, wherein the second indication of use indicates that the UE does not expect to transmit each TB of each of the at least one CG uplink shared channel occasion that the indication of use indicates that the UE does not expect to transmit.

Aspect 10: The method of any of aspects 1 through 9, further comprising: receiving, via the control signaling or via second control signaling, an indication of a quantity of uplink shared channel occasions to include in the subset.

Aspect 11: The method of any of aspects 1 through 10, further comprising: transmitting at least one TB in a CG uplink shared channel occasion of the subset, wherein the indication of use indicates that the UE expects to transmit the at least one TB.

Aspect 12: The method of any of aspects 1 through 11, wherein the UE does not transmit in any TB that the indication of use indicates the UE does not expect to transmit.

Aspect 13: The method of any of aspects 1 through 12, wherein the at least two TBs for each of the set of CG uplink shared channel occasions are spatially division multiplexed.

Aspect 14: A method for wireless communications at a network entity, comprising: outputting, to a UE, control signaling scheduling a set of CG uplink shared channel occasions, wherein each CG uplink shared occasion of the set of CG uplink shared channel occasions is configured for transmission of at least two TBs; and obtaining, from the UE, UCI comprising an indication of use for each of the at least two TBs relating to a subset of the set of CG uplink shared channel occasions.

Aspect 15: The method of aspect 14, wherein the indication of use comprises a first set of bits identifying one or more CG uplink shared channel occasions of the subset for which the UE expects to transmit fewer than all of the at least two TBs, and the indication of use further comprises a second set of bits indicating, for each of the one or more CG uplink shared channel occasions of the subset, one or more TBs that the UE expects to skip of the at least two TBs.

Aspect 16: The method of aspect 14, wherein the indication of use comprises a first set of bits identifying one or more CG uplink shared channel occasions of the subset for which the UE expects to transmit at least one of the at least two TBs, and the indication of use further comprises a second set of bits indicating, for each of the one or more CG uplink shared channel occasions of the subset, one or more TBs that the UE expects to transmit of the at least two TBs.

Aspect 17: The method of aspect 14, wherein the indication of use comprises a bitmap comprising a respective bit indicating whether the UE expects to transmit each of the at least two TBs for each CG uplink shared channel occasion of the subset.

Aspect 18: The method of aspect 14, wherein the indication of use comprises a respective bitmap for each of the at least two TBs, and each respective bitmap indicates whether the UE expects to transmit the respective TB for each CG uplink shared channel occasion of the subset.

Aspect 19: The method of any of aspects 14 through 18, wherein obtaining the UCI comprises: obtaining the UCI via a first CG uplink shared channel occasion of the set of CG uplink shared channel occasions.

Aspect 20: The method of aspect 19, further comprising: obtaining, via a second CG uplink shared channel occasion of the set of CG uplink shared channel occasions subsequent to the first CG uplink shared channel occasion, second UCI comprising a second indication of use for each of the at least two TBs with respect to a second subset of the set of CG uplink shared channel occasions, wherein at least one CG uplink shared channel occasion is included in the subset and the second subset.

Aspect 21: The method of aspect 20, wherein the indication of use indicates that the UE expects to transmit a first TB of the at least one CG uplink shared channel occasion, and the second indication of use indicates that the UE does not expect to transmit the first TB of the at least one CG uplink shared channel occasion.

Aspect 22: The method of any of aspects 20 through 21, wherein the second indication of use indicates that the UE does not expect to transmit each TB of each of the at least one CG uplink shared channel occasion that the indication of use indicates that the UE does not expect to transmit.

Aspect 23: The method of any of aspects 14 through 22, further comprising: outputting, via the control signaling or via second control signaling, an indication of a quantity of uplink shared channel occasions to include in the subset.

Aspect 24: The method of any of aspects 14 through 23, further comprising: obtaining, from the UE, at least one TB in a CG uplink shared channel occasion of the subset, wherein the indication of use indicates that the UE expects to transmit the at least one TB.

Aspect 25: The method of any of aspects 14 through 24, wherein the at least two TBs for each of the set of CG uplink shared channel occasions are spatially division multiplexed.

Aspect 26: A UE for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the UE to perform a method of any of aspects 1 through 13.

Aspect 27: A UE for wireless communications, comprising at least one means for performing a method of any of aspects 1 through 13.

Aspect 28: A non-transitory computer-readable medium storing code for wireless communications, the code comprising instructions executable by at least one processor (e.g., directly, indirectly, after pre-processing, without pre-processing) to perform a method of any of aspects 1 through 13.

Aspect 29: A network entity for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the network entity to perform a method of any of aspects 14 through 25.

Aspect 30: A network entity for wireless communications, comprising at least one means for performing a method of any of aspects 14 through 25.

Aspect 31: A non-transitory computer-readable medium storing code for wireless communications, the code comprising instructions executable by at least one processor (e.g., directly, indirectly, after pre-processing, without pre-processing) to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive control signaling scheduling a set of configured grant uplink shared channel occasions, wherein each configured grant uplink shared occasion of the set of configured grant uplink shared channel occasions is configured for transmission of at least two transport blocks, and transmit uplink control information comprising an indication of use for each of the at least two transport blocks relating to a subset of the set of configured grant uplink shared channel occasions, wherein the indication of use indicates one or more configured grant uplink shared channel occasions of the subset for which the UE expects to transmit fewer than all of the at least two transport blocks or to transmit at least one of the at least two transport blocks.

2. The UE of claim 1, wherein the indication of use comprises a first set of bits identifying the one or more configured grant uplink shared channel occasions of the subset for which the UE expects to transmit fewer than all of the at least two transport blocks, and the indication of use further comprises a second set of bits indicating, for each of the one or more configured grant uplink shared channel occasions of the subset, one or more transport blocks that the UE expects to skip of the at least two transport blocks.

3. The UE of claim 1, wherein the indication of use comprises a first set of bits identifying the one or more configured grant uplink shared channel occasions of the subset for which the UE expects to transmit at least one of the at least two transport blocks, and the indication of use further comprises a second set of bits indicating, for each of the one or more configured grant uplink shared channel occasions of the subset, one or more transport blocks that the UE expects to transmit of the at least two transport blocks.

4. The UE of claim 1, wherein the indication of use comprises a bitmap comprising a respective bit indicating whether the UE expects to transmit each of the at least two transport blocks for each configured grant uplink shared channel occasion of the subset.

5. The UE of claim 1, wherein:

the indication of use comprises a respective bitmap for each of the at least two transport blocks, and each respective bitmap indicates whether the UE expects to transmit the respective transport block for each configured grant uplink shared channel occasion of the subset.

6. The UE of claim 1, wherein, to transmit the uplink control information, the one or more processors are individually or collectively operable to execute the code to cause the UE to:

transmit the uplink control information via a first configured grant uplink shared channel occasion of the set of configured grant uplink shared channel occasions.

7. The UE of claim 6, wherein the one or more processors are individually or collectively further operable to execute the code to cause the UE to:

transmit, via a second configured grant uplink shared channel occasion of the set of configured grant uplink shared channel occasions subsequent to the first configured grant uplink shared channel occasion, second uplink control information comprising a second indication of use for each of the at least two transport blocks with respect to a second subset of the set of configured grant uplink shared channel occasions, wherein at least one configured grant uplink shared channel occasion is included in the subset and the second subset.

8. The UE of claim 7, wherein:

the indication of use indicates that the UE expects to transmit a first transport block of the at least one configured grant uplink shared channel occasion, and the second indication of use indicates that the UE does not expect to transmit the first transport block of the at least one configured grant uplink shared channel occasion.

9. The UE of claim 7, wherein the second indication of use indicates that the UE does not expect to transmit each transport block of each of the at least one configured grant uplink shared channel occasion that the indication of use indicates that the UE does not expect to transmit.

10. The UE of claim 1, wherein the one or more processors are individually or collectively further operable to execute the code to cause the UE to:

receive, via the control signaling or via second control signaling, an indication of a quantity of uplink shared channel occasions to include in the subset.

11. The UE of claim 1, wherein the one or more processors are individually or collectively further operable to execute the code to cause the UE to:

transmit at least one transport block in a configured grant uplink shared channel occasion of the subset, wherein the indication of use indicates that the UE expects to transmit the at least one transport block.

12. The UE of claim 1, wherein the at least two transport blocks for each of the set of configured grant uplink shared channel occasions are spatially division multiplexed.

13. A network entity, comprising:

one or more memories storing processor-executable code; and one or more processors coupled with the one or more memories and individually or collectively operable to execute the code to cause the network entity to:

output, to a user equipment (UE), control signaling scheduling a set of configured grant uplink shared channel occasions, wherein each configured grant uplink shared occasion of the set of configured grant uplink shared channel occasions is configured for transmission of at least two transport blocks; and obtain, from the UE, uplink control information comprising an indication of use for each of the at least two transport blocks relating to a subset of the set of configured grant uplink shared channel occasions, wherein the indication of use indicates one or more configured grant uplink shared channel occasions of the subset for which the UE expects to transmit fewer than all of the at least two transport blocks or to transmit at least one of the at least two transport blocks.

14. The network entity of claim 13, wherein the indication of use comprises a first set of bits identifying the one or more configured grant uplink shared channel occasions of the subset for which the UE expects to transmit fewer than all of the at least two transport blocks, and the indication of use further comprises a second set of bits indicating, for each of the one or more configured grant uplink shared channel occasions of the subset, one or more transport blocks that the UE expects to skip of the at least two transport blocks.

15. The network entity of claim 13, wherein the indication of use comprises a first set of bits identifying the one or more configured grant uplink shared channel occasions of the subset for which the UE expects to transmit at least one of the at least two transport blocks, and the indication of use further comprises a second set of bits indicating, for each of the one or more configured grant uplink shared channel occasions of the subset, one or more transport blocks that the UE expects to transmit of the at least two transport blocks.

16. The network entity of claim 13, wherein the indication of use comprises a bitmap comprising a respective bit indicating whether the UE expects to transmit each of the at least two transport blocks for each configured grant uplink shared channel occasion of the subset.

17. The network entity of claim 13, wherein:

the indication of use comprises a respective bitmap for each of the at least two transport blocks, and each respective bitmap indicates whether the UE expects to transmit the respective transport block for each configured grant uplink shared channel occasion of the subset.

18. The network entity of claim 13, wherein, to obtain the uplink control information, the one or more processors are individually or collectively operable to execute the code to cause the network entity to:

obtain the uplink control information via a first configured grant uplink shared channel occasion of the set of configured grant uplink shared channel occasions.

19. The network entity of claim 18, wherein the one or more processors are individually or collectively further operable to execute the code to cause the network entity to:

obtain, via a second configured grant uplink shared channel occasion of the set of configured grant uplink shared channel occasions subsequent to the first configured grant uplink shared channel occasion, second uplink control information comprising a second indication of use for each of the at least two transport blocks with respect to a second subset of the set of configured grant uplink shared channel occasions, wherein at least one configured grant uplink shared channel occasion is included in the subset and the second subset.

20. The network entity of claim 19, wherein:

the indication of use indicates that the UE expects to transmit a first transport block of the at least one configured grant uplink shared channel occasion, and the second indication of use indicates that the UE does not expect to transmit the first transport block of the at least one configured grant uplink shared channel occasion.

21. The network entity of claim 19, wherein the second indication of use indicates that the UE does not expect to transmit each transport block of each of the at least one configured grant uplink shared channel occasion that the indication of use indicates that the UE does not expect to transmit.

22. The network entity of claim 13, wherein the one or more processors are individually or collectively further operable to execute the code to cause the network entity to:

output, via the control signaling or via second control signaling, an indication of a quantity of uplink shared channel occasions to include in the subset.

23. The network entity of claim 13, wherein the one or more processors are individually or collectively further operable to execute the code to cause the network entity to:

obtain, from the UE, at least one transport block in a configured grant uplink shared channel occasion of the subset, wherein the indication of use indicates that the UE expects to transmit the at least one transport block.

24. The network entity of claim 13, wherein the at least two transport blocks for each of the set of configured grant uplink shared channel occasions are spatially division multiplexed.

25. A method for wireless communications at a user equipment (UE), comprising:

receiving control signaling scheduling a set of configured grant uplink shared channel occasions, wherein each configured grant uplink shared occasion of the set of configured grant uplink shared channel occasions is configured for transmission of at least two transport blocks, and transmitting uplink control information comprising an indication of use for each of the at least two transport blocks relating to a subset of the set of configured grant uplink shared channel occasions, wherein the indication of use indicates one or more configured grant uplink shared channel occasions of the subset for which the UE expects to transmit fewer than all of the at least two transport blocks or to transmit at least one of the at least two transport blocks.

26. The method of claim 25, wherein the indication of use comprises a first set of bits identifying the one or more configured grant uplink shared channel occasions of the subset for which the UE expects to transmit fewer than all of the at least two transport blocks, and the indication of use further comprises a second set of bits indicating, for each of the one or more configured grant uplink shared channel occasions of the subset, one or more transport blocks that the UE expects to skip of the at least two transport blocks.

27. The method of claim 25, wherein the indication of use comprises a first set of bits identifying the one or more configured grant uplink shared channel occasions of the subset for which the UE expects to transmit at least one of the at least two transport blocks, and the indication of use further comprises a second set of bits indicating, for each of the one or more configured grant uplink shared channel occasions of the subset, one or more transport blocks that the UE expects to transmit of the at least two transport blocks.

28. The method of claim 25, wherein the indication of use comprises a bitmap comprising a respective bit indicating whether the UE expects to transmit each of the at least two transport blocks for each configured grant uplink shared channel occasion of the subset.

29. The method of claim 25, wherein:

the indication of use comprises a respective bitmap for each of the at least two transport blocks, and each respective bitmap indicates whether the UE expects to transmit the respective transport block for each configured grant uplink shared channel occasion of the subset.

30. A method for wireless communications at a network entity, comprising:

outputting, to a user equipment (UE), control signaling scheduling a set of configured grant uplink shared channel occasions, wherein each configured grant uplink shared occasion of the set of configured grant uplink shared channel occasions is configured for transmission of at least two transport blocks; and obtaining, from the UE, uplink control information comprising an indication of use for each of the at least two transport blocks relating to a subset of the set of configured grant uplink shared channel occasions, wherein the indication of use indicates one or more configured grant uplink shared channel occasions of the subset for which the UE expects to transmit fewer than all of the at least two transport blocks or to transmit at least one of the at least two transport blocks.

* * * * *